United States Patent
Chow et al.

(10) Patent No.: US 6,804,612 B2
(45) Date of Patent: Oct. 12, 2004

(54) METHODS AND SYSTEMS FOR PERFORMING INTEGRATED ANALYZES, SUCH AS INTEGRATED ANALYZES FOR GAS TURBINE POWER PLANTS

(75) Inventors: Cedric Chow, Rego Park, NY (US); Kelly Crotty, Greenville, SC (US); John Drohan, Greer, SC (US); James Fehlberg, Simpsonville, SC (US); Arlie Russell Martin, Simpsonville, SC (US); Thad Morton, Greenville, SC (US); Todd Nemec, Guilderland, NY (US); David Pesetsky, Greenville, SC (US); Robert Russell Priestley, Balliston Lake, NY (US); Ming Zhou, Reading, MA (US)

(73) Assignee: General Electric Company, Schenectady, NY (US)

( * ) Notice: Subject to any disclaimer, the term of this patent is extended or adjusted under 35 U.S.C. 154(b) by 210 days.

(21) Appl. No.: 10/020,588

(22) Filed: Oct. 30, 2001

(65) Prior Publication Data

US 2003/0083827 A1 May 1, 2003

(51) Int. Cl.⁷ .............................................. G06F 19/00
(52) U.S. Cl. ......................... 702/34; 702/181; 702/136; 60/772; 60/806; 60/595; 700/29
(58) Field of Search ........................... 702/34, 181, 136; 60/772, 806, 595; 700/29

(56) References Cited

U.S. PATENT DOCUMENTS

| | | | |
|---|---|---|---|
| 4,612,621 A | | 9/1986 | Kaya et al. |
| 4,815,294 A | * | 3/1989 | David .......................... 60/595 |
| 5,791,147 A | | 8/1998 | Earley et al. |
| 5,794,446 A | | 8/1998 | Earley et al. |
| 6,063,129 A | | 5/2000 | Dadd et al. |
| 6,389,330 B1 | | 5/2002 | Khesin |
| 6,658,855 B1 | * | 12/2003 | Iles et al. ..................... 60/772 |
| 6,672,075 B1 | * | 1/2004 | Sandu et al. .................. 60/806 |
| 2003/0182944 A1 | * | 10/2003 | Hoffman et al. .............. 60/772 |

FOREIGN PATENT DOCUMENTS

WO   WO 00/12871   3/2000

* cited by examiner

Primary Examiner—John Barlow
Assistant Examiner—Aditya Bhat
(74) Attorney, Agent, or Firm—Nixon & Vanderhye P.C.

(57) ABSTRACT

Automated systems for performing integrated analyses. In one embodiment, an integrated analysis system can be used to comprehensively evaluate the effects of changes in hardware configuration or operating conditions on gas turbine power plant performance and economics. The system evaluates these changes by concurrently analyzing a number of different aspects of the power plant while ensuring that the data used in each of the different analyses is consistent. These analyses can include turbine and compressor aerodynamic analysis, cooling and leakage flow analysis, heat transfer analysis, part life analysis, heat balance analysis, cost analysis and overall power plant performance and economic analysis.

37 Claims, 9 Drawing Sheets

TP3 Settings

TP3 Areas (linked or unlinked): unlinked

Orange values need updating before use!

| | UNIT | TFA | | 8FA | 7F | TFA<br>S1S / S1B / S2N / S2S / S2B / S3N / S3S / S3B | 7FA+ | 7FA+e |
|---|---|---|---|---|---|---|---|---|
| RPM | Sysln RPM | 3600 | | 5254 | 3600 | 3600 | 3600 | 3600 |
| Frame Scale Factor | SF | 1 | | 1 | 1 | 1 | 1 | 1 |

S1N
| | | | | | | | | |
|---|---|---|---|---|---|---|---|---|
| roughness | CLAKV_STG1 | 30 | | 10 | 20 | 30 | 40 | 50 |
| inlet metal angle | SDIA_STG1 | 7 | | 4 | 6 | 7 | 10 | 12 |
| throat area | SPA_STG1 | 20 | | 15 | 18 | 20 | 22 | 24 |
| TE thickness | TEV_SQ1 | 20 | | 0 | 10 | 20 | 30 | 40 |

S1S tip clearance  TCL_STG1  0.4  |  0.3  0.4  0.4  0.2  0.8

S1B
| | | | | | | | | |
|---|---|---|---|---|---|---|---|---|
| surface roughness | CLAKB_STG1 | 200 | | 200 | 200 | 200 | 200 | 200 |
| inlet metal angle | RDIA_STG1 | 14 | | 10 | 12 | 14 | 16 | 18 |
| throat area | RPA_STG1 | 100 | | 100 | 100 | 100 | 100 | 100 |
| TE thickness | TEB_STG1 | 0.2 | | 0.2 | 0.2 | 0.2 | 0.2 | 0.2 |

S1 Data Match Adjusters
| | | | | | | | | |
|---|---|---|---|---|---|---|---|---|
| flow coefficient (S1N) | SCF_STG1 | 0.6 | | 0.4 | 0.5 | 0.6 | 0.7 | 0.8 |
| flow coefficient (S1B) | RCF_STG1 | 1 | | 1 | 1 | 1 | 1 | 1 |
| efficiency (S1N) | DETAV_STG1 | 0 | | 0 | 0 | 0 | 0 | 0.2 |
| efficiency (S1B) | DETAB_STG1 | 0 | | 0 | 0 | 0 | 0 | 0.2 |

S2N
| | | | | | | | | |
|---|---|---|---|---|---|---|---|---|
| roughness | CLAKV_STG2 | 30 | | 10 | 20 | 30 | 40 | 50 |
| inlet metal angle | SDIA_STG2 | 7 | | 4 | 6 | 7 | 10 | 12 |
| throat area | SPA_STG2 | 30 | | 26 | 28 | 30 | 32 | 34 |
| TE thickness | TEV_STG1 | 20 | | 0 | 10 | 20 | 30 | 40 |

S2S tip clearance  TCL_STG2  0.4  |  0.3  0.4  0.4  0.2  0.8

S2B
| | | | | | | | | |
|---|---|---|---|---|---|---|---|---|
| surface roughness | CLAKB_STG2 | 100 | | 100 | 100 | 100 | 100 | 100 |
| inlet metal angle | RDIA_STG2 | 14 | | 10 | 12 | 14 | 16 | 18 |
| throat area | RPA_STG2 | 180 | | 180 | 180 | 180 | 180 | 180 |
| TE thickness | TEB_STG1 | 0.2 | | 0.2 | 0.2 | 0.2 | 0.2 | 0.2 |

METHODS AND SYSTEMS FOR PERFORMING INTEGRATED ANALYZES, SUCH AS INTEGRATED ANALYZES FOR GAS TURBINE POWER PLANTS

BACKGROUND

The following disclosure relates generally to methods and systems for analyzing complex machinery and, more particularly, to computer-based methods and systems for performing integrated analyses of gas turbine and combined cycle power plants.

Many power plants employ turbines, such as steam or gas turbines, for the generation of electrical power. A typical gas turbine system includes at least an air inlet, a compressor, a combustor, and a turbine. The air inlet directs air into the compressor, which increases the air pressure. From the compressor, the pressurized air passes to the combustor, where the ignition of fuel introduced into the air stream heats the air and further increases the air pressure. From the combustor, the high pressure air flows into the turbine, which converts the kinetic energy of the air into mechanical shaft energy. This shaft energy is typically provided to a generator for generating electrical power. In addition, in some gas turbine power plants, a heat exchanger is positioned in the low pressure exhaust flow exiting the turbine to generate steam, which passes through a separate steam turbine to generate additional electrical power.

A typical turbine includes an alternating series of fixed stator blades or "nozzles" and rotatable rotor blades or "buckets." Throughout this disclosure, the term "expander" will be used instead of the word "turbine" when referring to the actual turbine portion of a gas turbine system (i.e., the nozzle and bucket assembly), to avoid confusion with the word "gas turbine," which will be used when referring to the overall gas turbine system that includes at least the compressor, combustor, and expander.

Important performance characteristics for power plants employing turbines can include power output, fuel usage rate, component operating life, exhaust gas temperature and composition, heat recovery system power output, and costs. As is known by those of ordinary skill in the relevant art, there are numerous engineering and economic analyses that can be used to evaluate these characteristics. For example, an aerodynamic analysis that focuses on the gas flow around the expander nozzles and buckets can be used to estimate power output from the expander. Similarly, a thermal analysis of the expander components in the hot gas path can be used to estimate component operating temperatures. These operating temperatures can then be used in conjunction with component stress analyses to estimate operational lifetimes for these components. Other known gas turbine analyses that can be used to evaluate the performance characteristics listed above include secondary flow analysis, heat recovery analysis, heat balance analysis, equipment and installation cost analysis, and operation and maintenance cost analysis.

Traditionally, each different type of gas turbine analysis has involved the use of a separate computer program, the execution of each program being the responsibility of a separate analytical group trained in that particular area of analysis. Although the different analyses are performed by separate groups, the results from the different analyses are typically integrated, at least at some level, by using the results from one program as variables or boundary conditions for one or more of the other programs. For example, the results from a hot gas path heat transfer analysis may be used as boundary conditions for the operating life analysis for a particular component.

In addition to integrating the results from the different analyses, the results are often compared to ensure they are physically consistent, and hence credible. For example, the gross power output resulting from the aerodynamic analysis of the expander can be compared to the net power output resulting from the overall gas turbine performance analysis to ensure that the net power output from the gas turbine does not exceed the gross power output from the expander. If such a comparison of results exposes an inconsistency between the different analyses, then the analyses are typically iterated after adjusting the variables to try and converge the analyses toward consistent solutions.

Conventional methods for integrating analyses and comparing results as described above typically involve the manual exchange of information between different analytical groups. This manual exchange can be both time-consuming and error-prone, especially when numerous iterations of the different analyses are required to converge the solutions. Accordingly, methods and systems that reduce the time and effort required by conventional systems to analyze gas turbine power plant configurations are desirable.

BRIEF DESCRIPTION OF DRAWINGS

FIG. 7 is a diagram illustrating a display page configured to receive information about a power plant configuration and present results of analyses in one embodiment.

FIG. 9 is a diagram illustrating a spreadsheet display page for presenting turbine aerodynamic analysis data in one embodiment.

DETAILED DESCRIPTION

Figure 1:
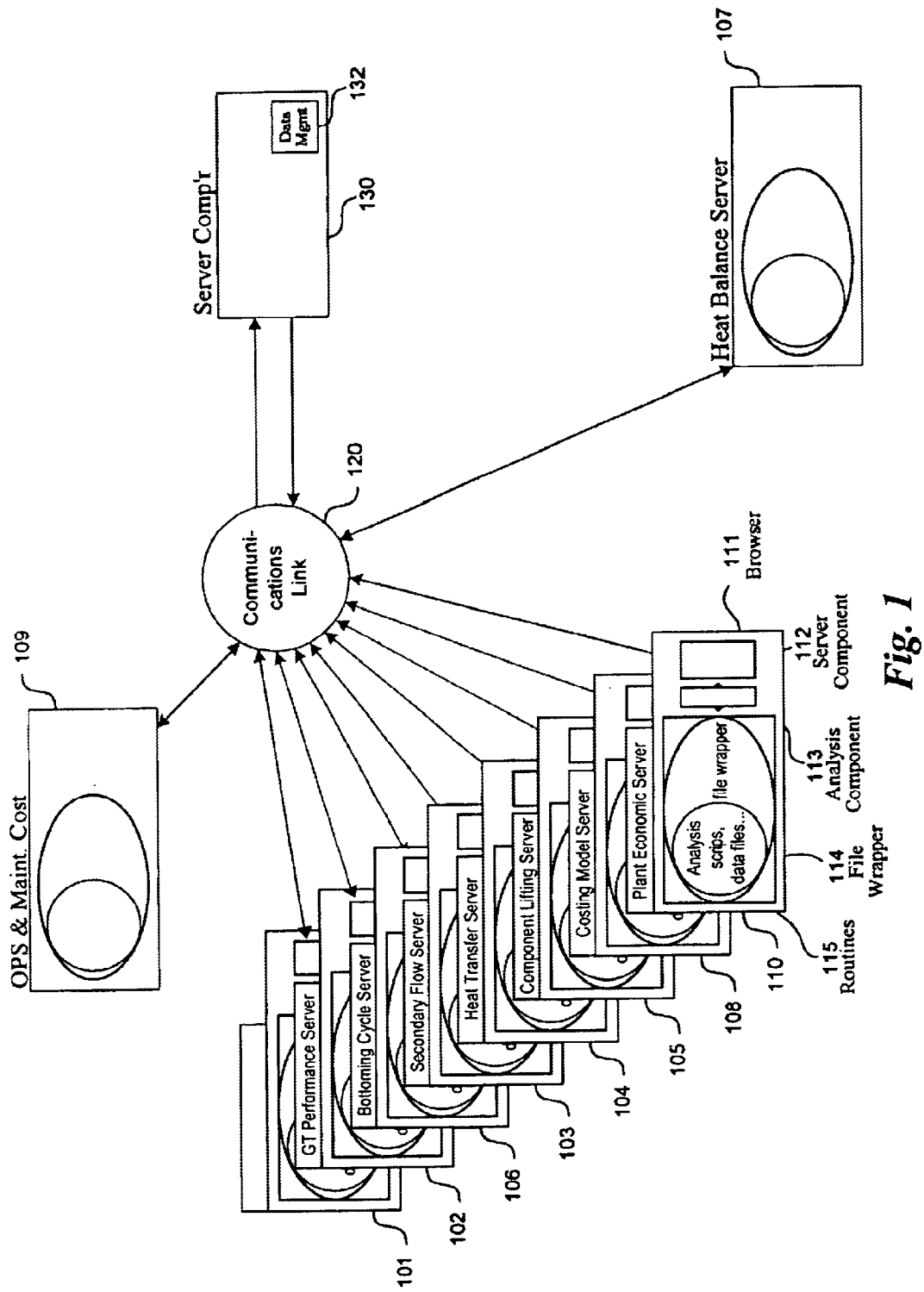
FIG. 1 is a block diagram illustrating components of an integrated analysis system in one embodiment.

The following disclosure describes automated systems for performing integrated analyses. In one embodiment, an integrated analysis system can be used to comprehensively evaluate the effects of changes in hardware configuration or operating conditions on gas turbine power plant performance and economics. In one aspect of this embodiment, the system evaluates these changes by concurrently analyzing a number of different aspects of the power plant while ensuring that the data used in each of the different analyses is consistent.

Comprehensive evaluation of a gas turbine power plant design requires the integration of a number of different engineering and economic analyses. These analyses can include turbine and compressor aerodynamic analysis, cooling and leakage flow (i.e., "secondary flow") analysis, heat transfer analysis, part life analysis, heat balance analysis, cost analysis and overall power plant performance and economic analysis. In one embodiment, a computer-based system for performing integrated analyses uses software integration technology to manage the data flow between these different analyses. When compared to the conventional method of manually extracting and transferring data between different analytical groups, use of the computer-based system in accordance with the present disclosure improves productivity by minimizing manual effort and reducing the likelihood of errors.

In one embodiment, an integrated analysis system in accordance with the present disclosure includes a plurality of user computers connected to each other and a server computer via a communications link. Each user computer includes a unique analysis component that corresponds to one particular type of power plant analysis. For example, in one embodiment, one of the user computers can be configured to perform an aerodynamic analysis of an expander section; another can be configured to perform a performance analysis of an overall gas turbine system; another can be configured to perform a secondary flow analysis; and so on. In this respect, each user computer in this embodiment can be considered to be a stand-alone "analysis module" configured to perform a particular type of analysis on a specific aspect of a gas turbine power plant. In alternate embodiments, two or more of the analysis components can reside on a single user computer. Indeed, in one alternate embodiment, all of the analysis components can reside on a single user computer.

In one embodiment, the server computer includes a data management component that integrates the data flow between the various analysis components on the user computers (i.e., between the various analysis modules). In other embodiments, the data management component can reside on one of the user computers, thus dispensing with the need for the separate server computer. In yet another embodiment, the data management component and all of the analysis components can reside on a single user computer, thus dispensing with the need for the separate server computer and enabling the entire integrated analysis to be performed on that single user computer.

In one embodiment, the integrated analysis system can be implemented to evaluate the effects of a hardware change or an operating operating change on a gas turbine power plant configuration by a user who operates a user computer to access a site on the server computer. From this site, the user accesses a user interface display page configured to receive information defining the gas turbine power plant configuration the user desires to evaluate. The display page also allows the user to select from a number of different analysis options to define particular results the user may be interested in or define how the integrated analysis system will iterate to arrive at the desired results. From this display page, the user can also access various other display pages that contain details of the gas turbine configuration and operating conditions, and change or modify these details to suit the user's particular interests. After the user has defined the configuration and operating conditions of the gas turbine power plant the user desires to evaluate, the user selects an execute button on the display page to initiate the integrated analysis process.

Initiation of the integrated analysis process causes the data management component to direct the different analysis modules to begin their respective analyses. As the different analysis modules perform their analyses, the data management component is directing the exchange of necessary data, such as boundary conditions and variables, back and forth between the different modules to facilitate their convergence toward analytically consistent solutions. When the different analysis modules have converged at the completion of the iteration cycles, the results are displayed for the user to view on an output summary display page. As explained above, these results can include performance characteristics such as power output, fuel usage, heat transfer, part life, secondary flow characteristics, costs, etc. If the user desires, the user can change selected configuration and operating condition parameters and repeat the evaluation to see what effects such changes have on the performance of the gas turbine power plant.

The following are some examples of potential studies where an integrated analysis system in accordance with the present disclosure could be useful: Determining the impact of new turbine blade materials on secondary flow analysis and performance; determining the impact of varying gas turbine firing temperatures on required secondary flows while maintaining prescribed component part life; determining the economic benefit of improving sealing technology in gas turbines by reducing leakage flows; determining the impact on gas turbine power plant economics and performance by trading component part lives with secondary cooling flow requirements; and determining the impact of interchanging parts between different expander designs.

Throughout this disclosure, certain embodiments of methods and systems for integrated analysis are described in the context of computer-executable instructions performed by a general-purpose computer, such as a personal computer. For example, in one embodiment, these computer-executable instructions are stored on a computer-readable medium, such as a floppy disk or CD-ROM. In other embodiments, these instructions are stored on a server computer system and accessed via a communications link or computer network such as an intranet or the Internet. Because the basic structures and functions related to the computer-executable routines and corresponding computer implementations systems are well known, they have not been shown or described in detail here, to avoid unnecessarily obscuring the described embodiments.

Although the following disclosure provides specific details for a thorough understanding of several embodiments of the methods and systems described, one of ordinary skill in the relevant art will understand that these embodiments may be practiced without some of these details. In other instances, it will be appreciated that the methods and systems described can include additional details without departing from the spirit or scope of the disclosed embodiments.

Although some embodiments are described in the context of power plants, such as gas turbine power plants, it will be understood that the methods and the systems disclosed are equally applicable to much broader applications and, accordingly, can be used to analyze other types of mechanical or physical systems in addition to those described here. Further, it will be appreciated that the methods described for analyzing systems in an integrated manner can be apportioned between different computational devices and computer systems in many different ways, depending on the particular application. In one embodiment described above, for example, each unique analysis component is performed on a separate, dedicated computer and networked using a data management component resident on a remote server computer. In another embodiment as discussed above, two or more of the analysis components can be implemented on a single computer. In yet another embodiment, all of the operative components—the analysis and data management components—can reside on a single computer. These and other embodiments will be understood by those of ordinary skill in the relevant art to fall within the scope with the present disclosure.

FIG. 1 is a block diagram illustrating components of an integrated analysis system 100 in one embodiment. The integrated analysis system 100 includes user computers 101–110 connected to a server computer 130 and each other via a communications link 120. In one aspect of this embodiment, the communications link 120 is a computer network, such as a local area network (LAN), an intranet or the Internet. The user computers 101–110 may include a central process unit, memory devices, input devices (e.g., keyboard and pointing device), output devices (e.g., display devices), and storage devices (e.g., disk drives). The memory and storage devices are computer-readable media that may contain computer instructions for implementing methods and systems, such as routines and display pages, in accordance with this disclosure.

The user computer 110 is substantially similar to the other user computers 101–109 and includes a browser module 111 that allows a user to access and exchange data with other sites via the communications link 120, including web sites within the World Wide Web portion of the Internet and server computers within an intranet or other LAN. In one aspect of this embodiment, the user computer 110 also includes an analysis component 113 that is unique to a particular area of gas turbine power plant analysis. In the illustrated embodiment of FIG. 1, for example, the analysis component 113 performs various analyses related to gas turbine power plant economics.

The analysis component 113 includes a file wrapper 114 and various routines 115. In the case of the analysis component 113, the routines 115 include basic economic equations known to those of ordinary skill in the art of evaluating economic aspects of gas turbine power plants. The file wrapper 114 includes a set of pre-set variables and constants that are needed to perform the associated routines 115 and initiate communication with the other analysis components. For example, with regard to a gas turbine power plant economic analysis, the file wrapper 114 might include initial fuel, power, or maintenance prices that are necessary to begin such analysis. In a further aspect of this embodiment, the user computer 110 includes a server component 112 that facilitates the exchange of data and variables between the analysis component 113 and the other analysis components associated with the other user computers 101–109. In this respect, the combination of the analysis component 113 and the server component 112 residing on the user computer 110 can be considered to be a "plant economics module."

As mentioned above, the other user computers 101–109 are substantially similar to the user computer 110 with the exception that the other user computers contain analysis components uniquely configured to perform other types of gas turbine analyses. For example, in one embodiment, the user computer 101 is configured to perform gas turbine aerodynamic analysis (an "aerodynamic module"), the user computer 102 is configured to perform overall gas turbine performance analysis (a "performance module"), the user computer 103 is configured to perform secondary flow analysis (a "secondary flow module"), the user computer 104 is configured to perform heat transfer analysis (a "heat transfer module"), the user computer 105 is configured to perform component life analysis (a "component life module"), the user computer 106 is configured to perform bottoming cycle analysis (a "bottoming cycle module"), the user computer 107 is configured to perform heat balance analysis (a "heat balance module"), the user computer 108 is configured to perform equipment and installation cost analysis (an "equipment and installation cost module"), and the user computer 109 is configured to perform operations and maintenance cost analysis (an "operations and maintenance cost module"). Accordingly, each of the separate user computers 101–110 can be considered to be a separate analysis module for performing a particular type of gas turbine power plant analysis. The different analyses performed by these modules will be explained in greater detail below.

Although the embodiment illustrated in FIG. 1 shows each of the different analysis modules being associated with a separate user computer, in other embodiments, two or more of these modules can be associated with a single computer. Thus, throughout this disclosure, the term "analysis module" will refer to the combination of an analysis component (e.g., the analysis component 113) and a server component (e.g., the server component 112), capable of analyzing a particular aspect of a power plant, such as a gas turbine power plant. Accordingly, in some embodiments, analysis modules will be associated with separate computers, while in other embodiments, two or more analysis modules may be associated with a single computer.

In one embodiment, the server computer 130 includes a data management component 132 that directs the exchange of data (i.e., inputs and outputs) between the various server components residing on the user computers 101–110 as the computers iterate their analyses to converge on consistent solutions. The server computer also includes a display page component 134 that contains various display pages, such as user interface display pages, that will be described in greater detail below. Although the data management component 132 and the display page component 134 are located on the server computer 130 in this embodiment, in other embodiments, the data management and display page components can reside on one of the user computers 101–110.

The integrated analysis system 100 can be implemented in one embodiment as follows: A user begins by operating one of the user computers, for example, user computer 101, to request a first user interface display page from the server computer 130 via the communications link 120. On this first display page, the user identifies all of the other user computers that will be needed to perform the desired analyses. For example, if the user desires to perform all of the analysis modules contained on the user computers 101–110, then the user will identify all of the user computers 102–110 on the first display page. In one aspect of this embodiment, the user can identify these user computers by entering their electronic LAN addresses. In other embodiments, the user computers could be selected by name from a drop-down list. If the user does not desire a particular type of analysis, then the user does not need to identify the corresponding user computer. For example, if the user is not interested in the results of a component life analysis, then the user could elect not to identify the user computer 105. Similarly, if a particular user computer, for example, the user computer 104, is not "powered up" when the user initiates the integrated analysis, then the corresponding analysis, in this case, a heat transfer analysis, will not be performed or integrated into the other analyses.

After the user has identified the necessary user computers, the user requests a second user interface display page from the server computer 130. This second display page is configured to receive selected parameters defining the gas turbine power plant configuration the user wishes to evaluate. The user enters these parameters and selects an execute button to initiate the integrated analyses. The data management component 132 on the server computer 130 then directs the different analysis modules to begin their analyses based on the parameters entered by the user. Concurrently, the data management component 132 is directing the exchange of data between the different analysis modules as necessary for the modules to iterate their respective analyses toward consistent solutions. Thus, as the different modules generate their respective results, these results are compared to ensure that they are analytically consistent, and hence credible. Once the results have converged within a specified range, they are displayed on the user computer for the user to view. If the user desires, the user can revisit the original gas turbine configuration parameters and change them to see what effect the changes might have on the relative performance characteristics of the gas turbine.

In the foregoing embodiment, the data management component 132 and the display page component 134 reside on the server computer 130. In an alternate embodiment, these components can reside on one of the user computers, for example, the user computer 101. Accordingly, in this alternate embodiment, the first and second display pages described above will be accessed from the user computer 101. Similarly, the exchange of data between the different user computers will be directed from the user computer 101. Thus, this alternate embodiment eliminates the need for the server computer 130. As will be apparent to the those of ordinary skill in the relevant art, however, these and other similar changes can be made to the integrated analysis system 100 without departing from the spirit or scope of the present disclosure.

Figure 2:
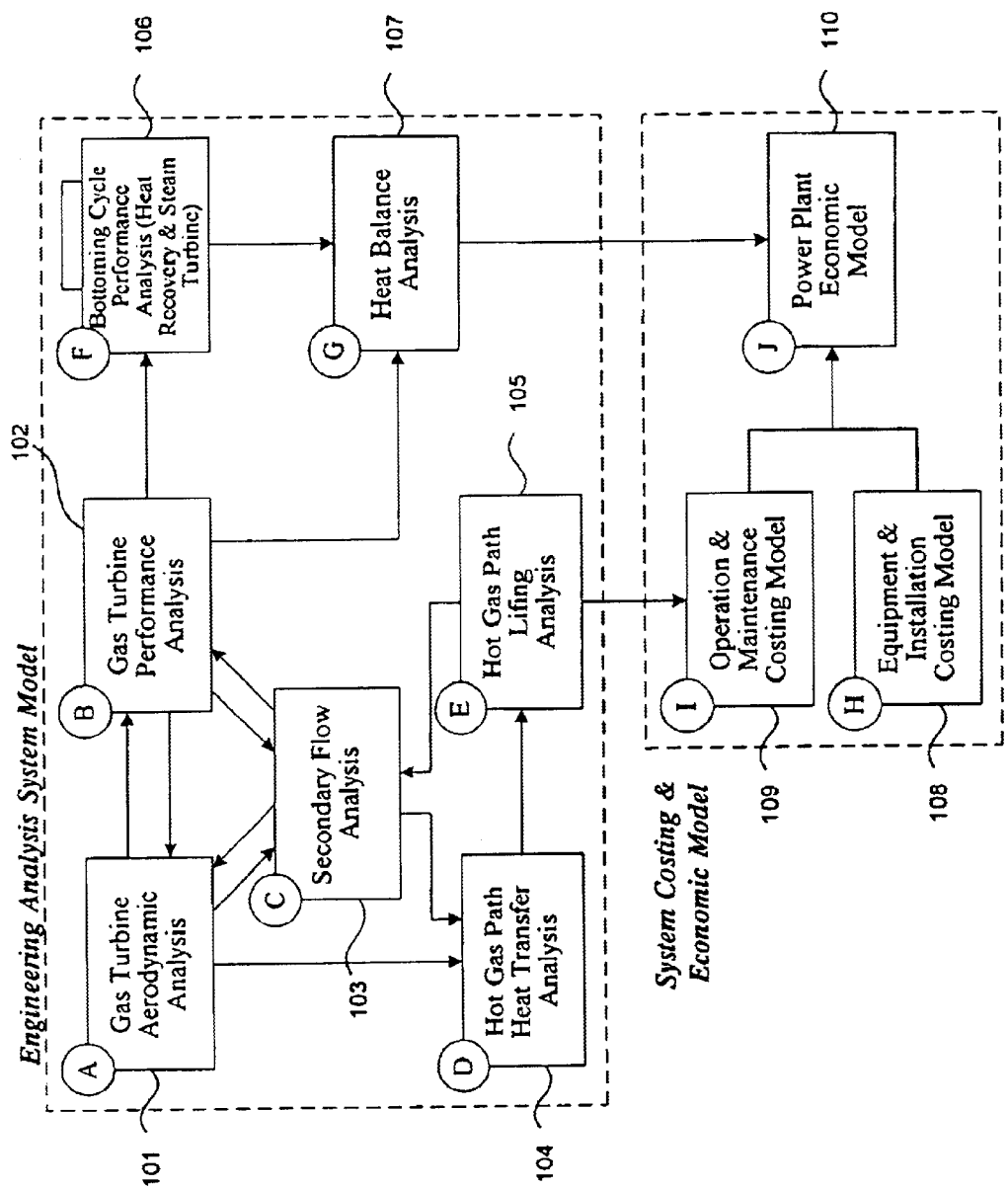
FIG. 2 is a block diagram illustrating data flows between different analysis modules in one embodiment.

FIG. 2 is a block diagram illustrating data flows between different analysis modules in one embodiment. In one aspect of this embodiment, each box in FIG. 2 represents one of the analysis modules shown in FIG. 1. The arrows indicate directions of data flow between the modules. The purpose of FIG. 2 is to provide a general description of the types of analysis performed by the different modules and the types of data that are exchanged. Both of these aspects of the integrated analysis system, however, will be described in greater detail below in reference to FIGS. 3–6.

In one embodiment, the aerodynamic module 101 analyzes the state of the flow around the gas path components in the expander section of a gas turbine. Some of the known modeling techniques contained in the aerodynamic module 101 include one-dimensional (1D) pitchline performance modeling, quasi-3D (i.e., 2½ D) streamline/streamtube modeling, and 3D viscous computational fluid-dynamic (CFD) modeling. In other embodiments, other known aerodynamic equations can be included in the aerodynamic module 101. The aerodynamic analysis performed by the aerodynamic module 101 can provide turbine stage efficiencies, turbine stage pressure ratios, and turbine stage work breakdowns for the overall gas turbine performance analysis performed by the performance module 102. Such aerodynamic analysis can also provide boundary conditions for the secondary flow analysis performed by the secondary flow module 103 and for the heat transfer analysis performed by the heat transfer module 104.

The performance module 102 is a thermodynamic analysis model that evaluates the power output, heat rate, fuel consumption, and other performance parameters for a gas turbine power plant. This module also provides expander parameters, such as flow rate, flow composition (fuel to air ratio F/A), inlet pressure, inlet temperature, and exhaust pressure, which are needed for the expander aerodynamic analysis performed by the aerodynamic module 101. The performance module 102 also provides boundary conditions for the secondary flow analysis performed by the secondary flow module 103 and calculates the exhaust flow conditions needed for the bottoming cycle analysis performed by the bottoming cycle module 106.

The secondary flow module 103 analyzes air flows passing outside the main gas path of a gas turbine, such as cooling air flows that pass between the compressor and the expander bypassing the combustor. The accurate modeling and prediction of secondary flows such as these are often critical to both performance and life of gas turbines. Two features of this embodiment are the integration of existing component flow models to a network-based system flow model, and the provision of a mechanism to study the interchangeability between component flow models. These features improve the consistency and accuracy of the secondary flow analysis by solving the system of analytical models encompassed by the aerodynamic module 101, the performance module 102, and the secondary flow module 103. The secondary flow analysis performed by the secondary flow module 103 provides compressor extraction flows and turbine dilution flows to the performance module 102 and the aerodynamic module 101. The secondary flow module 103 also provides portions of this flow data to the heat transfer module 104 for analysis of the heat transfer between various expander components.

The heat transfer module 104 performs an analysis that provides the external and internal heat transfer coefficients and temperature distributions for the hot gas path components. This analysis can utilize known techniques such as finite element modeling, 3D CFD employing fluid turbulence models such as the k-$\epsilon$ and k-$\Omega$ models, and other empirical and correlation-based tools. The heat transfer results from this analysis are important for the hot gas path lifing analysis performed by the component life module 105.

The purpose of the hot gas path lifing analysis performed by the component life module 105 is to determine the expected life span (e.g., number of starts, number of hours of operation, etc.) of the hot gas path components (e.g., the first, second, and third stage nozzle and bucket assemblies of the expander). Typical failure mechanisms of hot gas path components include local/bulk creep, low/high cycle fatigue, excessive mechanical stress, and oxidation. The material limitations of each of these failure mechanisms are highly dependent on the temperature of the hot gas path components in question. For a detailed evaluation of component life, known finite element methods can be used to perform a thermal/mechanical analysis of hot gas path components. In one embodiment, cooling data curves can be utilized to estimate the cooling flows required for the hot gas path components to meet their desired life span targets. The component life module 105 can then provide this flow data to the secondary flow module 103 to impose cooling requirements on the secondary flow. Another function of the component life module 105 is to quantify the expected life span of hot gas path components and provide this data to the operation and maintenance cost module 109. As explained in greater detail below, the operation and maintenance cost module 109 can then perform a cost analysis to determine the impact of component life on the operation and maintenance costs for a given power plant configuration.

As is known by those of ordinary skill in the relevant art, combined cycle gas turbine systems often include a heat recovery steam generation system that uses the hot exhaust from the main turbine to generate additional electrical power. The bottoming cycle module 106 performs an analysis that involves the calculation of the quantity and quality of steam produced by such a heat recovery steam generation system to analyze the performance of the bottoming cycle steam turbine. The bottoming cycle analysis can also include a steam turbine performance model that calculates the electrical power output from a generator mechanically coupled to the steam turbine. This bottoming cycle performance data (e.g., the generator electrical output) is then passed on to the heat balance module 107.

The heat balance module 107 performs a gas turbine power plant heat balance analysis to evaluate the performance of an overall gas turbine power plant system. This overall system performance depends on the individual performances of the gas turbine portion and, if a bottoming cycle is included, the steam turbine portion. The heat balance analysis also calculates power usage requirements for auxiliary systems of the gas turbine power plant. In one embodiment, the final results provided by the heat balance analysis include a net power output and a net heat rate for a gas turbine power plant. These results are passed on to the plant economic module 110.

The equipment and installation cost module 108 performs an analysis that determines the turnkey cost of the power plant to a customer. Based on the equipment scope and the labor rate for the specific location of the gas turbine power plant in question, the turnkey cost can be estimated using equipment cost regression analysis or data provided by the manufacturers of the power plant equipment. Such economic analyses are known to those of ordinary skill in the art of equipment and installation cost estimating. The results from the equipment and installation cost module 108 are passed on to the plant economic module 110.

The operation and maintenance cost module 109 determines the annual costs of operating a gas turbine power plant. Many factors can affect the overall operation and maintenance of a power plant, including expected operating duty (number of operating hours and number of starts per year), costs of replacing consumable parts, costs of spare parts kept on site, maintenance/inspection intervals, and the scope of the power plant equipment used. The economic equations used to determine these costs are known to those of ordinary skill in the relevant art. The operation and maintenance costs determined by the operation and maintenance cost module 109 are provided to the plant economic module 110.

The plant economic module 110 evaluates the incremental economic benefit of new hardware or features added to a power plant based on input from the heat balance module 107, the equipment and installation cost module 108, and the operation and maintenance cost module 109. In one embodiment, this determination is made by performing a cost/benefit analysis. For example, if a new hardware configuration improves the net power output of a power plant, then the economic benefit from this performance increase should exceed the cost of implementing the new hardware over time. In another embodiment, the power plant economic analysis can be used to evaluate the benefit of new hardware in terms of quantitative dollar amount. Such analysis can include the cost of electricity, a detailed power producer Performa, or an expected market price regression model. These economic models involve equations known to those of ordinary skill in the relevant art, and utilize the power plant performance (output and heat rate) from the heat balance module 107, turnkey costs from the equipment and installation cost module 108, and annual operation and maintenance costs (such as fuel costs and capacity factors) from the operation and maintenance cost module 109, in addition to other economic assumptions.

The different analysis modules shown in FIG. 2 and described above can be implemented according to various routines in accordance with this disclosure. For example, in a first routine that will be described in greater detail below, the aerodynamic module 101 and the performance module 102 iterate to the exclusion of the other modules to converge on a mutually consistent set of solutions. For purposes of this discussion, iteration between these two modules can be referred to here as an "inner loop." In this first routine, after the two inner loop modules have converged, their results are provided to the other modules as shown by the arrows in FIG. 2 so that the other modules can proceed to perform their respective analyses using the provided results.

In a second routine that will be described in greater detail below, the aerodynamic module 101, the performance module 102, and the secondary flow module 103 iterate to the exclusion of the other modules to converge on a mutually consistent set of solutions. For the purposes of this discussion, iteration between these three modules can be referred to here as an "outer loop." In this second routine, after the three outer loop modules have converged, their results are provided to the other modules as shown by the arrows in FIG. 2 so that the other modules can proceed to perform their respective analyses using the provided results. In one aspect of this embodiment, this second routine may provide higher fidelity results than the first routine because of the inclusion of the secondary flow module 103 in this second routine. Although two routines have been described above for implementing the integrated analysis system shown in FIGS. 1 and 2, other routines can be used depending on the particular application, the particular results or fidelity desired, or the particular computational devices available.

Figure 3:
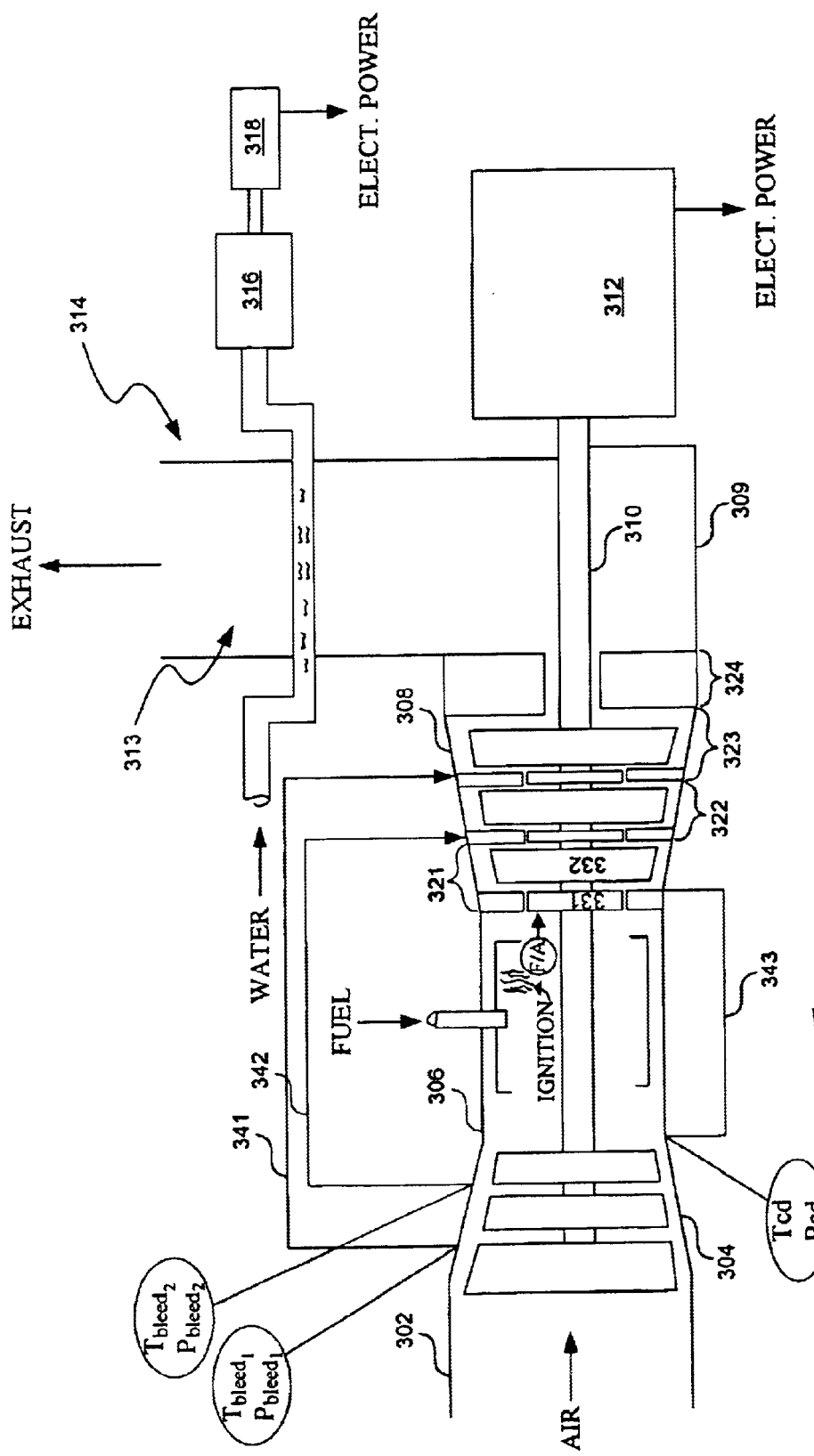
FIG. 3 is a schematic diagram of a gas turbine power plant in accordance with one embodiment.

FIG. 3 is a schematic diagram of a gas turbine power plant 300 in accordance with one embodiment. FIG. 3 is intended to provide a context for the discussion of FIG. 4 that follows regarding the data exchange between the aerodynamic module 101, the performance module 102, and the secondary flow module 103 shown in FIGS. 1 and 2. Although FIG. 3 depicts one possible gas turbine power plant configuration for purposes of illustration, those of ordinary skill in the relevant art will appreciate that the present disclosure is not limited to this configuration, but instead extends to other configurations of turbine-based power plants.

The gas turbine power plant 300 includes an air inlet 302 that introduces air to a compressor 304. Pressurized air passes from the compressor 304 into a combustor 306 where fuel is mixed with the air and ignited to further increase the air pressure. From the combustor 306, the high pressure/high temperature fuel/air mixture passes to a first expander 308. The first expander 308 includes a first stage 321, a second stage 322, and a third stage 323. Each stage includes a fixed nozzle assembly (stator blades) and a rotating bucket assembly (rotor blades). For example, the first stage 321 includes a nozzle assembly 331 and a bucket assembly 332. As the fuel/air mixture flows through the first expander 308, its pressure progressively drops until it ultimately passes through exit guide vanes 324 into an exhaust duct 309. The kinetic energy of the fuel/air mixture passing through the first expander 308 turns a shaft 310, which in turn drives a first generator 312 that produces electrical power output.

In the illustrated embodiment of FIG. 3, the gas turbine power plant 300 includes a bottoming cycle 314 that utilizes a heat recovery steam generator (HRSG) 313. In one embodiment, the HRSG 313 flows water in thermal proximity to the hot exhaust gases flowing through the exhaust duct 309 to generate steam. This steam then passes through a second expander 316 that provides shaft energy to a second generator 318 for producing additional electrical power output.

The gas turbine power plant 300 of the illustrated embodiment includes a plurality of secondary air flow circuits that provide cooling air to the first expander 308. For example, a first secondary flow circuit 341 allows low pressure air from the compressor 304 to bypass the combustor 306 and pass to a low pressure portion of the first expander 308. A second secondary flow circuit 342 allows medium pressure air from the compressor 304 to bypass the combustor 306 and pass to a medium pressure portion of the first expander 308. Similarly, a third secondary flow circuit 343 allows high pressure air from the compressor discharge portion of the compressor 304 to bypass the combustor 306 and pass to a high pressure portion of the first expander 308.

A number of different physical properties can be used to describe various aspects of the flow through the gas turbine power plant 300. For example, a fuel-to-air ratio (F/A) defines the ratio of fuel to air introduced into the expander 308. A total pressure ($P_t$) defines the total pressure of the flow at the forward plane of the first stage nozzle assembly 331, and an exit pressure ($P_{exit}$) defines the total pressure of the flow at the aft plane of the exit guide vanes 324. A fire temperature ($T_{fire}$) defines the flow temperature at the aft plane of the first stage nozzle assembly 331. As will be explained in greater detail below, these four variables can be used in one embodiment to determine various operating conditions and performance aspects of the gas turbine power plant 300.

Other variables can be used to describe the nature of the secondary flows through the gas turbine power plant 300. For example, $T_{bleed1}$ and $P_{bleed1}$ define the temperature and pressure at a first bleed port where low pressure air enters the first secondary flow circuit 341. $T_{bleed2}$ and $P_{bleed2}$ define the temperature and total pressure at the second bleed port where medium pressure air enters the second secondary flow circuit 342. Similarly, $T_{cd}$ and $P_{cd}$ define the temperature and pressure at the compressor discharge plane where high pressure air enters the third secondary flow circuit 343. As will be explained in greater detail below, these six variables can be used in one embodiment to determine the percentage of the flow through the gas turbine power plant 300 that bypasses the combustor 306 and is introduced into the first expander 308 for cooling purposes.

Figure 4:
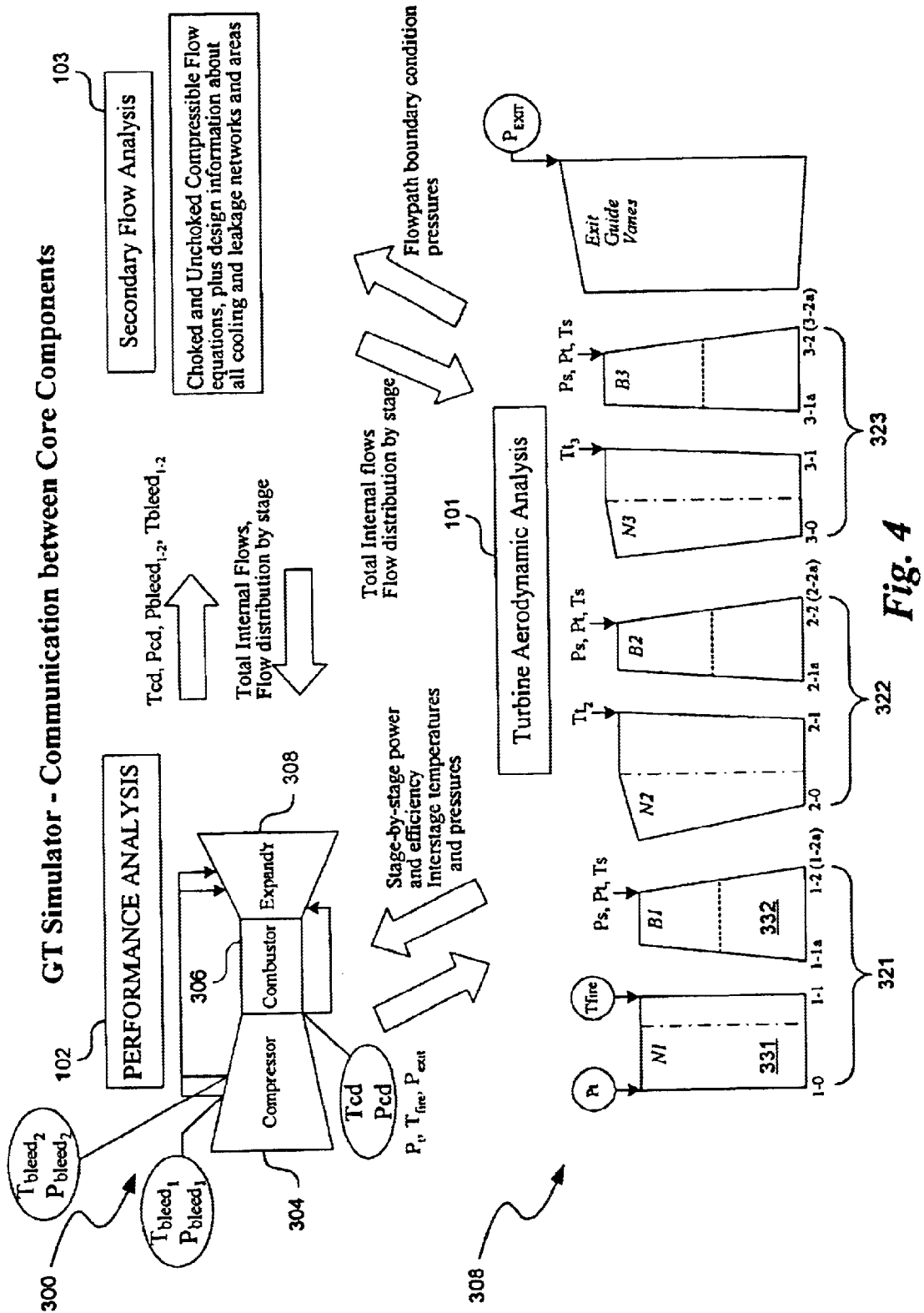
FIG. 4 is a diagram illustrating a data flow between a performance module, an aerodynamic module and a secondary flow module in one embodiment.

FIG. 4 is a diagram illustrating a data flow between the performance module 102, the aerodynamic module 101, and the secondary flow module 103 in one embodiment. For purposes of illustration, the performance module 102 is represented by the schematic drawing of the compressor/combustor/expander combination in the upper left portion of FIG. 4, the aerodynamic module 101 is represented by the exploded schematic drawing of the expander stages in the lower portion, and the secondary flow module 103 is represented by the box marked "Secondary Flow Analysis" in the upper right portion. In one aspect of this embodiment, the arrows indicate different directions that selected data flows between the respective modules as the modules iterate their analyses to converge on a consistent set of results.

As mentioned above, the integrated analysis system 100 (FIG. 1) can use at least two different routines to evaluate a selected gas turbine configuration in accordance with this disclosure. The first routine begins by iterating analyses between the performance module 102 and the aerodynamic module 101 (collectively referred to as the "inner loop") to the exclusion of the other modules to determine a consistent set of selected performance parameters for the gas turbine power plant. The first routine then transfers these parameters to the other modules so that the other modules can use them to perform their analyses. The second routine begins by iterating analyses between the performance module 102, the aerodynamic module 101, and the secondary flow module 103 (collectively referred to as the "outer loop") to the exclusion of the other modules to determine a consistent set of selected performance parameters for the gas turbine power plant. The second routine then transfers these parameters to the other modules so that the other modules can use them to perform their own particular analyses. In one aspect of this embodiment, the second "outer loop" routine may provide a more accurate analysis of the gas turbine configuration than the first "inner loop" routine as a consequence of iterating between three analysis modules instead of only two. Both the inner and outer loop routines introduced above are explained in greater detail below.

The performance module 102 initiates the inner loop routine by simultaneously solving a system of continuity, energy, and momentum equations to determine values for the property variables $P_t$, $T_{fire}$, and $P_{exit}$. Equations for calculating property variables such as these are known to those of ordinary skill in the relevant art of gas turbine power plant analysis. Once initial values for $P_t$, $T_{fire}$, and $P_{exit}$ have been determined by the performance module 102, they are transferred to the aerodynamic module 101 to determine interstage pressure and temperature variables such as a static pressure $P_s$, a total pressure $P_t$, and a static temperature $T_s$ at the trailing edges of each of the first, second, and third stage bucket assemblies. The aerodynamic module 101 also uses these values to determine total temperatures $T_{t2}$ and $T_{t3}$ at the trailing edges of the second and third stage nozzle assemblies, respectively. The aerodynamic module 101 determines the interstage variables $P_s$, $P_t$, $T_s$, $T_{t2}$, and $T_{t3}$ using standard continuity, energy, and momentum equations known to those of ordinary skill in the art of expander analysis. Once the aerodynamic module 101 has determined these variables, it uses them to calculate a stage power and a stage efficiency for each of the three expander stages 321, 322, and 323. These stage powers and efficiencies and the interstage pressure and temperature variables are then transferred back to the performance module 102. The performance module 102 then updates its analytical model of the gas turbine power plant with the stage powers and efficiencies and the interstage pressure and temperature variables received from the aerodynamic module 101.

Those of ordinary skill in the relevant art will understand that if the initial analysis performed by the performance module 102 agrees with the feedback value of $P_t$ received from the aerodynamic module 101 (usually because the expander is choked at the first stage nozzle throat or because the internal flow distribution around a nozzle throat remains constant), then the initial values of $P_t$, $T_{fire}$, and $P_{exit}$ determined by the performance module 102 will not change when the performance module updates its analytical model with the variables received from the aerodynamic module 101. In this case, the performance module 102 does not determine new values for $P_t$, $T_{fire}$, and $P_{exit}$, and, accordingly, there is no need for the performance module to transfer any new values for these variables back to the aerodynamic module 101 in an iterative cycle. Instead, the performance module 102 and the aerodynamic module 101 use the initial values for these variables to determine performance parameters for the power plant (such as fuel usage, power output, heat transfer, etc.). These performance parameters are then distributed to the other analysis modules as shown in FIG. 2 so that the other modules can perform their analyses.

Conversely, if the feedback value of $P_t$ received from the aerodynamic module 101 does not agree with the initial $P_t$ value determined by the performance module 102, then $P_t$, $T_{fire}$ and $P_{exit}$ may change when the performance module 102 updates its analytical model with the stage powers and efficiencies and the interstage pressure and temperature variables received from the aerodynamic module 101. In this case, the performance module 102 determines new values for $P_t$, $T_{fire}$, and $P_{exit}$ and compares the new values for these variables to the prior values to determine whether they are within an acceptable tolerance range of agreement. In one embodiment that will be discussed in greater detail below, the user can specify the acceptable tolerance range in the form of an "error percentage." The error percentage can be determined in one embodiment by subtracting the prior variable value from the new variable value to obtain a difference, and then dividing the difference by the prior variable value and multiplying by 100. If the new values are within the specified range (i.e., the new and prior values have suitably converged), then no further data exchanges or analytical iterations are required between the performance module 102 and the aerodynamic module 101, and their results are distributed to the other analysis modules as shown in FIG. 2.

If, however, the new values of $P_t$, $T_{fire}$, and $P_{exit}$ are not within an acceptable range of their prior values, then the performance module 102 provides the new values for these variables back to the aerodynamic module 101 in a first iteration cycle. The aerodynamic module 101 then determines new stage powers and efficiencies and interstage pressure and temperature variables using the new values for $P_t$, $T_{fire}$, and $P_{exit}$ provided by the performance module 102. The aerodynamic module 101 then transfers the new stage powers and efficiencies and interstage pressure and temperature variables back to the performance module 102. The performance module 102 then determines new values for the variables $P_t$, $T_{fire}$, and $P_{exit}$ for a second time and compares them to their prior values. As above, if the new values for these variables have suitably converged toward the prior values, then the iteration cycle is complete and the results can be provided to the other analysis modules. If not, the inner loop routine repeats until suitable convergence is reached.

In the outer loop routine embodiment, the performance module 102 and the aerodynamic module 103 first iterate as explained above (i.e., the inner loop) to arrive at a consistent set of variables that includes $P_t$, $T_{fire}$, $P_{exit}$, stage powers and efficiencies, and interstage pressure and temperature variables. Once the inner loop is complete, the performance module 102 provides the secondary flow module 103 with $T_{bleed1}$, $P_{bleed1}$, $T_{bleed2}$, $P_{bleed2}$, $T_{cd}$, and $P_{cd}$, and the aerodynamic module 101 provides the secondary flow module with flow path boundary condition pressures. Using this input from the performance module 102 and the aerodynamic module 101, in conjunction with design information defining cooling and leakage networks of the gas turbine, the secondary flow module 103 determines the total internal flow distribution for the gas turbine.

In one embodiment, the internal flow distribution determined by the secondary flow module 103 can include the percentage of the internal flow that passes through the secondary flow circuits 341, 342, and 343 to the expander 308 bypassing the combustor 306. This internal flow distribution can also include the per-stage flow distribution through the expander 308. The secondary flow module 103 determines these flow distribution parameters using compressible flow equations known to those of ordinary skill in the relevant art. These flow distribution parameters are transferred from the secondary flow module 103 back to the performance module 102 and the aerodynamic module 101. The performance module 102 and the aerodynamic module 101 update their analytical models with this flow distribution data received from the secondary flow module 103.

As stated above, if the feedback value of $P_t$ received from the aerodynamic module 101 agrees with the initial value of $P_t$ determined by the performance module 102, then the values of $P_t$, $T_{fire}$ and $P_{exit}$ as initially calculated by the performance module 102 will not change when the performance module updates its analytical model with the flow distributions received from the secondary flow module 103. In this case, the performance module 102 does not determine new values for $P_t$, $T_{fire}$ and $P_{exit}$ and, accordingly, there is no need for the performance module to transfer any new values for these variables to the aerodynamic module 101 or back to the secondary flow module 103 in an iterative cycle. Instead, the performance module 102 and the aerodynamic module 101 use the initial values determined for these variables, plus the flow distribution data provided by the secondary flow module 103, to determine performance parameters for the power plant (such as fuel usage, power output, heat transfer, etc.). These performance parameters are then distributed to the other analysis modules as shown in FIG. 2 so they can perform their own particular analyses.

Conversely, if the feedback value of $P_t$ received from the aerodynamic module 101 does not agree with the initial value of $P_t$ determined by the performance module 102, then $P_t$, $T_{fire}$, and $P_{exit}$ may change when the performance module 102 updates its analytical model with the flow distribution data received from the secondary flow module 103. In this case, the performance module 102 does determine new values for the variables $P_t$, $T_{fire}$, and $P_{exit}$ and compares these new values to the prior values to determine whether they are within an acceptable tolerance range of agreement. If the new values are within the specified range (i.e., they have suitably converged) then no further data exchanges or analytical iterations are required between the performance module 102, the aerodynamic module 101, and the secondary flow module 103, and their results are distributed to the other analysis modules as shown in FIG. 2 for use in performing their analyses.

If, however, the new values of $P_t$, $T_{fire}$, and $P_{exit}$ are not within the acceptable range of their prior values, then the outer loop routine essentially repeats in an iterative cycle until consecutive values for these variables converge within the acceptable range. That is, the performance module 102 and the aerodynamic module 101 perform the inner loop routine using the flow distribution data received from the secondary flow module 103 until they have successfully converged on consistent solutions. They then again provide new values for $T_{bleed1}$, $P_{bleed1}$, $T_{bleed2}$, $P_{bleed2}$, $T_{cd}$, and $P_{cd}$, and flow path boundary condition pressures to the secondary flow module 103. The secondary flow module 103 then uses these new values to determine a new total internal flow distribution for the gas turbine. This new flow distribution data is then transferred back to the performance module 102 and the aerodynamic module 101 from the secondary flow module 103, and the process explained above for determining new values for the variables $P_t$, $T_{fire}$, and $P_{exit}$ and checking them for convergence is repeated until successive iterations fall within the acceptable range. Once these values converge, the performance module 102, the aerodynamic module 101, and the secondary flow module 103 use these values to determine performance parameters for the power plant (such as fuel usage, power output, heat transfer, cooling flows, etc.). These performance parameters are then distributed to the other analysis modules as shown in FIG. 2 so they can perform their own particular analyses.

Figure 5:
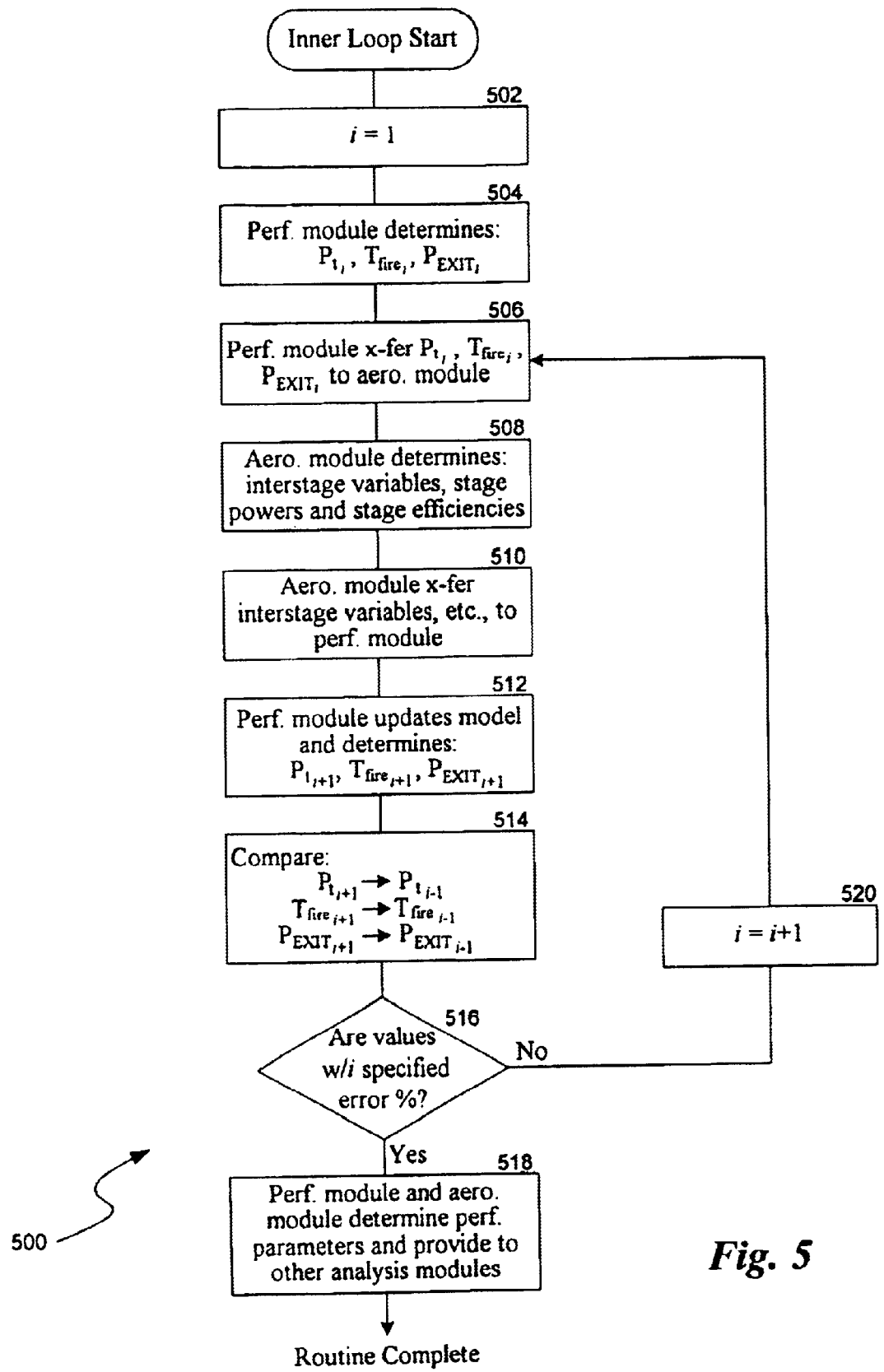
FIG. 5 is a flow diagram illustrating a routine for implementing the integrated analysis system of FIG. 1 in one embodiment.

FIG. 5 is a flow diagram illustrating a routine 500 for implementing the integrated analysis system in one embodiment. In one aspect of this embodiment, the reader will observe that the routine 500 substantially reflects the steps outlined above for the inner loop as described in conjunction with FIG. 4. In block 502, the routine 500 begins by setting an initial i value equal to 1. In block 504, the performance module 102 (FIG. 1) determines initial values for $P_t$, $T_{fire}$, and $P_{exit}$. In block 506, the performance module 102 transfers these initial values to the aerodynamic module 101 (FIG. 1). In block 508, the aerodynamic module 101 determines interstage temperature and pressure variables and stage powers and efficiencies using the initial values for $P_t$, $T_{fire}$, and $P_{exit}$ received from the performance module 102. In block 510, the aerodynamic module 101 transfers these interstage pressure and temperature variables and stage powers and efficiencies back to the performance module 102. In block 512, the performance module 102 updates its analysis model and determines new values for $P_t$, $T_{fire}$, and $P_{exit}$.

In block 514, the routine 500 compares the new values for $P_t$, $T_{fire}$, and $P_{exit}$ to the initial values for $P_t$, $T_{fire}$, and $P_{exit}$, respectively, to determine the error percentage between the respective values. In decision block 516, the routine determines whether the error percentage is within a specified allowable range. In one embodiment, the user can specify this allowable range. As discussed above, in the case where the flow through the gas turbine is choked, there will not be any significant difference between the first and second sets of these values. Hence, in this case the routine proceeds to block 518 where the performance module 102 and the aerodynamic module 101 provide the results of their analyses to the other analysis modules as shown in FIG. 2 and the routine 500 is complete.

Conversely, if the new set of $P_t$, $T_{fire}$, and $P_{exit}$ values are not within the specified allowable range of the initial set of these values, then in block 520 the routine sets the i value equal to i+1 and returns to block 506 and repeats. Accordingly, the routine 500 will iterate in this fashion until consecutive values for the variables $P_t$, $T_{fire}$, and $P_{exit}$ converge within the specified allowable range. Upon such convergence at decision block 516, the performance module 102 and the aerodynamic module 101 will provide the results of their analyses to the other analysis modules in accordance with block 518 and the routine 500 is complete.

Figure 6:
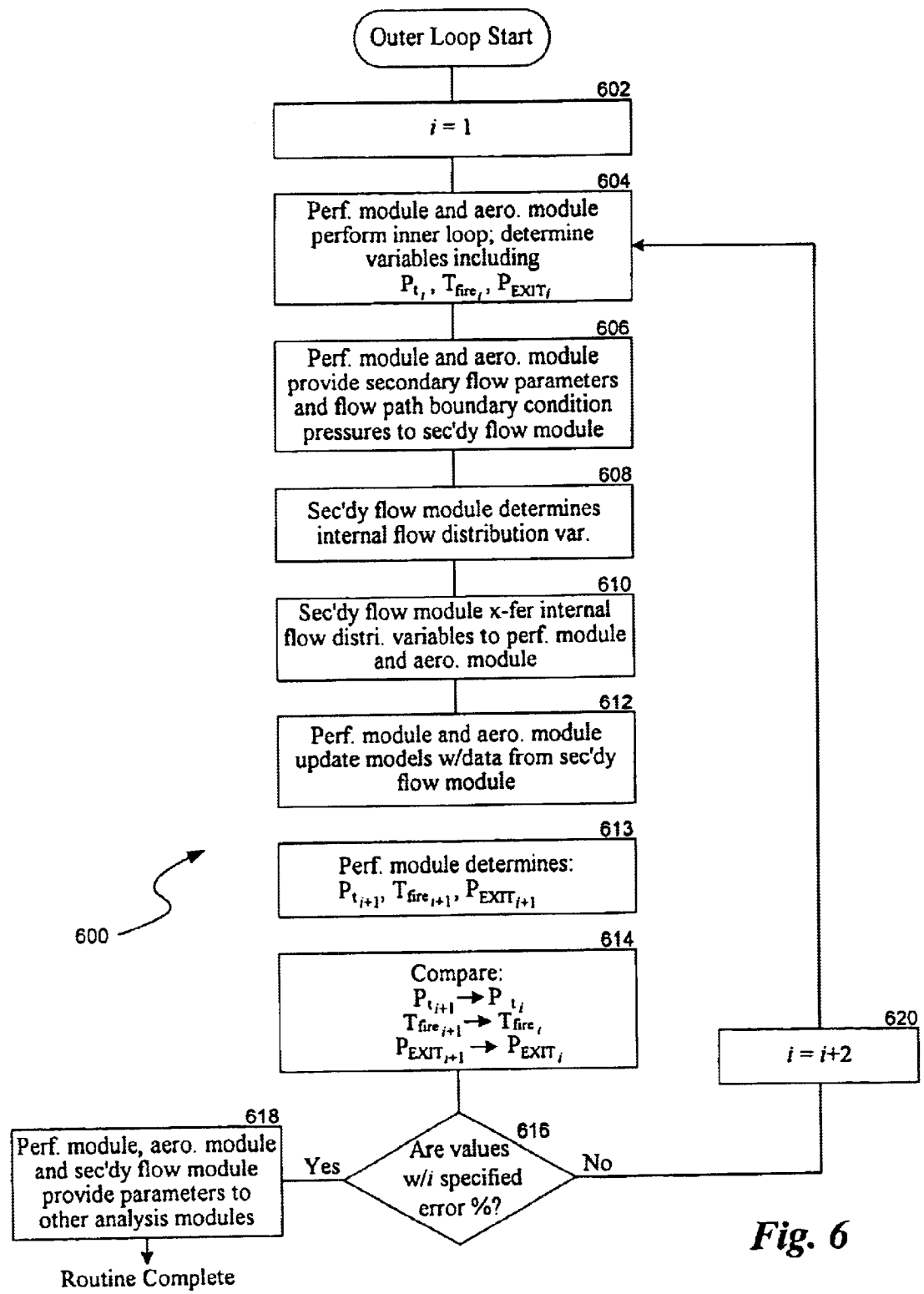
FIG. 6 is a flow diagram illustrating a routine for implementing the integrated analysis system of FIG. 1 in another embodiment.

FIG. 6 is a flow diagram illustrating a routine 600 for implementing the integrated analysis system in one embodiment. In one aspect of this embodiment, the reader will observe that the routine 600 substantially reflects the steps outlined above for the outer loop as described in conjunction with FIG. 4. The routine 600 begins in block 602 by setting the initial i value equal to 1. In block 604, the performance module 102 (FIG. 1) and the aerodynamic module 101 (FIG. 1) perform the inner loop substantially in accordance with the routine 500 of FIG. 5 to determine a first set of values for the variables $P_t$, $T_{fire}$, and $P_{exit}$ in addition to other parameters. These other parameters include secondary flow parameters such as $T_{cd}$, $P_{cd}$, $P_{bleed}$, and $T_{bleed}$, and flow path boundary condition pressures.

In block 606, the performance module 102 and the aerodynamic module 101 provide the secondary flow parameters and the flow path boundary condition pressures, respectively, to the secondary flow module 103 (FIG. 1). In block 608, the secondary flow module 103 determines a total internal flow distribution and a stage-by-stage flow distribution for the gas turbine configuration being evaluated. In block 610, this flow distribution data is provided back to the performance module 102 and the aerodynamic module 101. In block 612, the performance module 102 and the aerodynamic module 101 update their analysis models with the flow data received from the secondary flow module 103. In block 613, the performance module 102 determines a new set of values for the variables $P_t$, $T_{fire}$, and $P_{exit}$ based on the data received from the secondary flow module 103.

In block 614, the routine 600 compares the new values for $P_t$, $T_{fire}$, and $P_{exit}$ to the initial values for $P_t$, $T_{fire}$, and $P_{exit}$, respectively, to determine the error percentage between the respective values. In decision block 616, the routine determines whether the error percentage is within a specified allowable range. In one embodiment, the user can specify this allowable range. As discussed above, in the case where the flow through the gas turbine is choked, there will not be any significant difference between the first and second sets of these values. Hence, in this case the routine proceeds to block 618 where the performance module 102, the aerodynamic module 101, and the secondary flow module 103 provide the results of their analyses to the other analysis modules (see FIG. 2) so that the other modules may proceed to perform their respective analyses of the gas turbine, and the routine is complete.

Conversely, if the new values for the variables $P_t$, $T_{fire}$, and $P_{exit}$ are not within the specified allowable range, then in block 620 the routine sets the i value equal to i+2 and returns to block 604 and repeats. Accordingly, the routine will iterate in this fashion until consecutive values for the variables $P_t$, $T_{fire}$, and $P_{exit}$ converge within the specified allowable range. Upon such convergence at decision block 616, the performance module 102, the aerodynamic module 101, and the secondary flow module 103 will provide the results of their analyses to the other analysis modules in accordance with block 618 and the routine 600 is complete.

Figure 7:
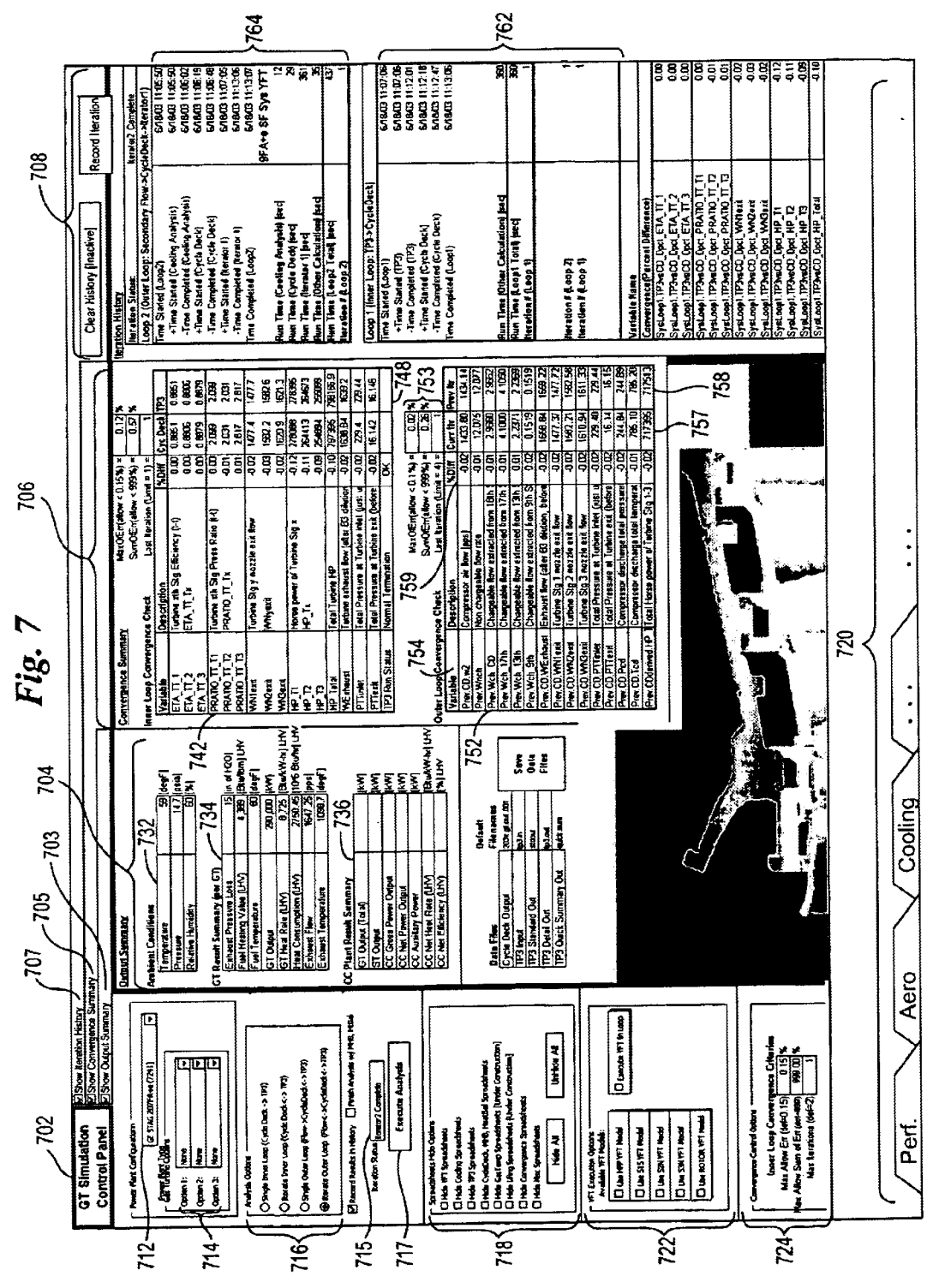

FIG. 7 is a diagram illustrating a display page 700 for receiving information about a power plant configuration and presenting analyses results in one embodiment. In one aspect of this embodiment, the display page 700 includes a user input portion 702, an output summary portion 704, a convergence summary portion 706, and an iteration history portion 708. The user input portion 702 includes various fields where the user can define a power plant configuration and select various analysis options. For example, the user input portion 702 includes a power plant configuration field 712 for receiving a power plant configuration the user desires to evaluate. In one aspect of this embodiment, the power plant configuration field 712 can include a drop-down list that includes various configuration options. The user input portion 702 also includes one or more turbine option fields 714. The turbine option fields 714 can include drop-down lists for entering various turbine hardware options. For example, in one embodiment such a drop-down list can include different compressor options. In other embodiments, other options such as combustor or expander options can be included.

The user input portion 702 of the illustrated embodiment further includes an analysis option portion 716. The analysis option portion 716 includes a number of user selectable analysis options. For example, in one embodiment the analysis option portion 716 includes a "single inner loop" option that corresponds to performing a single iteration between the performance module 102 and the aerodynamic module 101; an "iterate inner loop" option that corresponds to iterating between the performance module 102 and the aerodynamic module 101; a "single outer loop" option that corresponds to performing a single iteration between the performance module 102, the aerodynamic module 101, and the secondary flow module 103, and an "iterate outer loop" option that corresponds to iterating between the performance module 102, the aerodynamic module 101, and the secondary flow module 103. The user can accordingly select which analysis option is desired by "clicking" the circle adjacent to the desired option. After doing so, the user starts the corresponding integrated analysis by selecting an execute analysis button 717. An iteration status field 715 indicates the status of the analysis to the user.

The user input portion 702 further includes a spreadsheet option portion 718 that lists spreadsheet options which correspond to page tabs located on a tab bar 720 positioned toward the bottom of the display page 700. The spreadsheet option portion 718 includes a user selectable list of spreadsheet options that include topics such as cooling, aerodynamic analysis, performance analysis, heat balance analysis, etc. By clicking in the box adjacent to the spreadsheet option, the user can elect to hide the corresponding tab on the tab bar 720. Hiding a tab makes the corresponding spreadsheet inaccessible to the user. Similarly, the user can elect to hide all of the spreadsheet tabs by selecting the hide all button 719. Alternatively, the user can elect to show all of the available spreadsheet tabs by selecting an unhide all button 721. The tab bar 720 enables the user to access spreadsheets by simply clicking on the corresponding tab. In general, these spreadsheets can include tables of iterated property variables calculated for various locations and conditions within the turbine, or design information defining physical parameters of different aspects of the gas turbine. Much of the content of these spreadsheets can be modified by the user to evaluate the effects of such modifications on the gas turbine. The content of some of these spreadsheets will be explained in greater detail below.

The user input portion 702 further includes an analysis model portion 722. The analysis model portion 722 includes a list of user selectable analysis model options. These options include models that focus the analysis on various areas of a gas turbine, such as the stage one shroud (S1S), the stage two nozzle (S2N), and the stage three nozzle (S3N). By focusing the analysis, the user can obtain detailed information about how a change to a particular area of a gas turbine affects performance. In other embodiments, other analysis model options can be provided. Accordingly, the user can select a particular analytical model by simply checking the box adjacent to the desired option.

The user input portion 702 further includes a convergence control portion 724 that includes a max allowable error field, a max allowable sum of the errors field, and a max iterations field. The user can utilize the convergence control portion 724 to establish the convergence criteria for the integrated analysis system. In the evaluation of a particular gas turbine configuration, for example, the user may want the error between the different analysis modules to not exceed a certain percentage, such as 0.15%. In this example, the user would enter 0.15 in the max allowable error field. Similarly, if the user did not want the sum of all of the errors to exceed a certain number, the user could enter this number in the max allowable sum of the errors field. Finally, if the user wanted to limit the number of iterations between the different analysis modules, the user could specify this limit in the max iterations field.

The output summary portion 704 of the display page 700 includes a number of fields that present ambient conditions and results of the integrated analysis system. In one embodiment, these results include various performance parameters associated with the power plant configuration being evaluated. For example, the output summary portion 704 of the illustrated embodiment includes a gas turbine result summary portion 734, a combined cycle power plant result summary portion 736, and a data file portion 738 in addition to an ambient condition portion 732. The ambient condition portion 732 includes a number of fields for displaying the ambient gas turbine operating conditions. For example, in one aspect of this embodiment, temperature, pressure, and humidity fields are provided. The gas turbine results summary portion 734 includes a number of fields for displaying performance parameters of the gas turbine configuration. For example, in one aspect of this embodiment, this portion includes a gas turbine output field, a gas turbine heat rate field, and a heat consumption field in addition to other pertinent performance parameter fields. Similarly, the combined cycle plant result summary portion 736 includes a number of fields for displaying performance parameters associated with a combined cycle power plant such as the total gas turbine power output including the combined cycle, the combined cycle net power output, and the combined cycle net heat rate. The data files portion 738 includes a number of fields that identify the file names associated with the different analytical data files used by the integrated analysis system.

The convergence summary portion 706 includes a number of fields that present the results of successive iterations of the performance module 102 and the aerodynamic module 101. These results include values for variables such as internal flow properties and stage power outputs. The convergence summary portion 706 includes an inner loop convergence check portion 742 and an outer loop convergence check portion 752. The inner loop portion 742 includes a variable column 744, an error percentage column 749, a performance module column 747, and an aerodynamic module column 748. For any given variable listed in the variable column 744, a corresponding value calculated by the performance module 102 can be found in the adjacent field in the performance module column 747, and a corresponding value calculated by the aerodynamic module 101 can be found in the adjacent field in the aerodynamic module column 748. Successive iterations of these values are shown side by side so that the convergence can be viewed by the user in real-time. The difference between the values calculated by the two modules is presented in the error percentage column 749. Thus, a user can determine the error between the two different analytical modules for a given performance variable by reference to the inner loop convergence check portion 742. A summary portion 743 displays the maximum allowable error as specified by the user in the convergence control option portion 724, the summary of all of the inner loop errors, and a count of the last iteration.

The outer loop convergence check portion 752 is substantially similar to the inner loop convergence check portion 742 described above. Accordingly, the outer loop portion 752 includes a variable column 754, a current iteration column 757, a previous iteration column 758 and an error percentage column 759. The current iteration column 757 displays the variable value as calculated by the current iteration of the outer loop, whereas the previous iteration column 758 displays the value calculated during the previous iteration of the outer loop. The difference between these two values is presented in the error percentage column 759.

Thus, a user can determine the error between successive iterations of the outer loop by reference to the outer loop convergence check portion 752. A summary portion 753 is substantially similar to the summary portion 743 described above.

The iteration history portion 708 includes a number of fields that show the start and stop times for the various analysis iterations, and includes an inner loop history portion 762 and an outer loop history portion 764. These portions are substantially similar to each other and include an iteration status column that lists the different analytical events associated with each loop and the times each of the events starts or completes.

The display page 700 also includes a number of control panel options that allow the user to select which portions of the display page the user desires to view. For example, the display page 700 includes a show iteration history option 707, a show convergence summary option 705, and a show output summary option 703. Accordingly, the user can select which of these portions to display by checking the box adjacent to the desired option. As will be apparent to those of ordinary skill in the relevant art, the display page 700 includes only a few of the possible data fields or graphics associated with the integrated analysis system 100 (FIG. 1). In other embodiments, additional display portions or fewer display portions could be included to suit the particular application or particular hardware available to the user.

Figure 8:
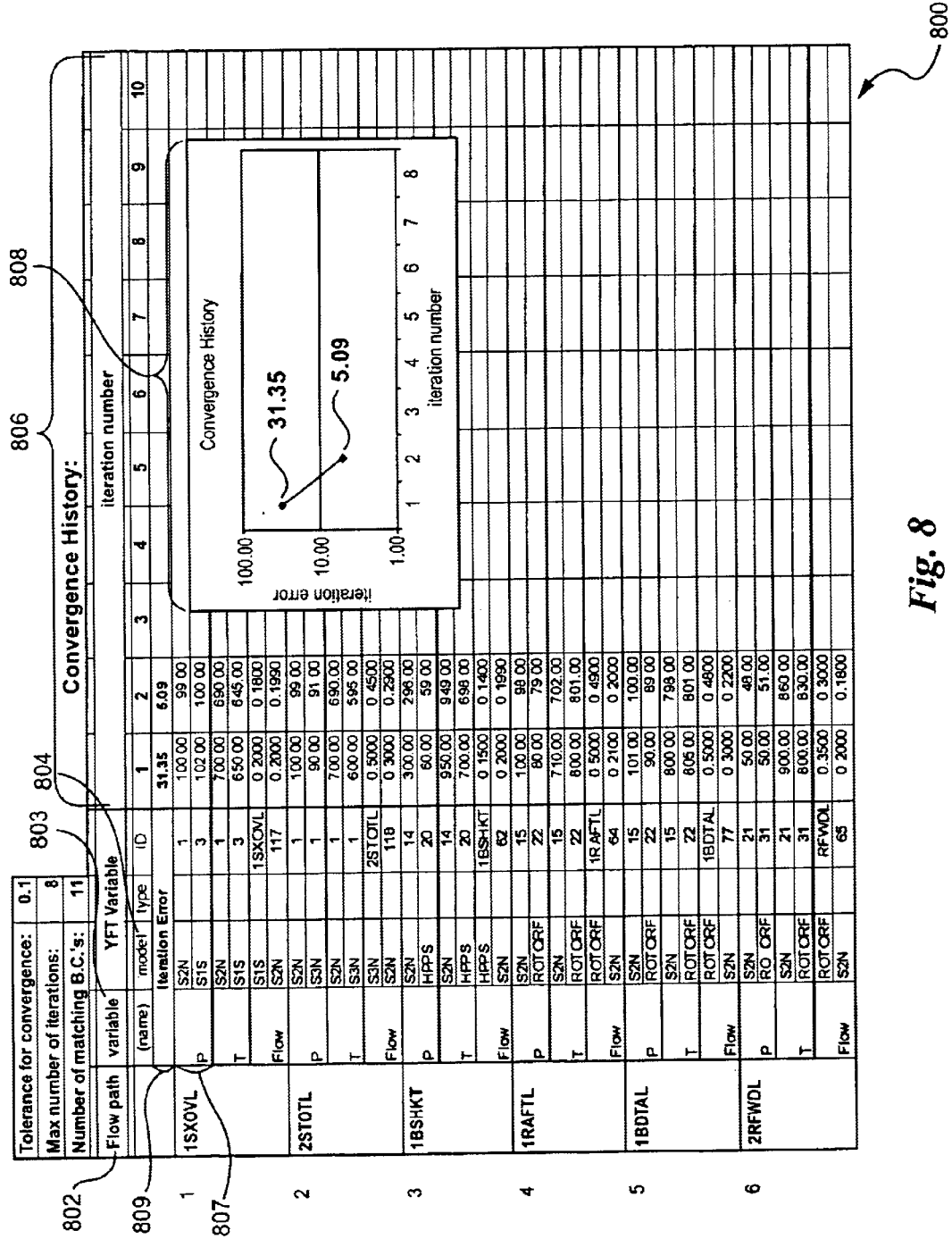
FIG. 8 is a diagram illustrating a spreadsheet display page for presenting turbine analysis data in one embodiment.

FIG. 8 is a diagram illustrating a display page 800 for presenting turbine analysis spreadsheet data in one embodiment. In one aspect of this embodiment, the display page 800 is presented after the user selects a corresponding spreadsheet tab on the tab bar 720 of the display page 700 of FIG. 7. In the illustrated embodiment, the display page 800 corresponds to a convergence history spreadsheet which illustrates convergence history for gas turbine internal flow models. For example, the display page 800 includes a flow path column 802 that identifies which internal flow path has been analyzed. For each such internal flow path, the display page 800 includes a variable column 803 identifying a property variable for the flow such as pressure, temperature, or flow rate. A model column 804 identifies which models were used to determine the corresponding variable. In one embodiment, the models include the stage two nozzle (S2N) model, the stage one shroud (S1S) model, and the stage three nozzle (S3N) model. In other embodiments, other models can be included. Each variable is calculated using two different models. Referring to row 807, for example, the pressure (P) is calculated using both the S2N model and the S1S model. The convergence history of the variables is included in a convergence history portion 806. The convergence history portion 806 includes two or more columns that include the values of the variables corresponding to successive model iterations. Referring to row 807 again, it can be seen that the pressure (P) in the first iteration is 96.73 psi when calculated with the S2N model and 94.80 psi when calculated with the S1S model. An iteration error field 809 displays the magnitude of the total error between the respective variable values for each iteration. For example, in the illustrated embodiment, the total error for the first iteration was 31.35 and this was reduced to 5.09 in the second iteration.

The display page 800 also includes a convergence history graphic 808. The convergence history graphic 808 includes a graph that measures iteration error on the vertical axis and iteration number on the horizontal axis. For example, in the illustrated embodiment, the iteration error of 31.35 corresponding to the first iteration cycle and the iteration error of 5.09 corresponding to the second iteration cycle are both charted on the convergence history graphic 808. Accordingly, the display page 800 utilizes both numeric and graphic data to convey and represent convergence history associated with the integrated analysis system.

FIG. 9 is a diagram illustrating a display page 900 for presenting turbine aerodynamic analysis spreadsheet data in one embodiment. In one aspect of this embodiment, the display page 900 is presented after the user has selected the corresponding spreadsheet tab on the tab bar 720 of the display page 700 of FIG. 7. The display page 900 includes an expander configuration portion 902 and a stage details portion 904. The expander configuration portion 902 includes a stage list 906 that lists each of the different expander stages. For example, in the illustrated embodiment, the stage list 906 includes the stage one nozzle (S1N), the stage one shroud (S1S), the stage one bucket (S1B), etc. Configuration columns 908 list the different types of hardware configurations available for the respective expander stages. Initially, the hardware configuration shown for each stage (e.g., 6FA+e SF for the S1N) will correspond to the turbine configuration selected by the user in the configuration field 712 of the display page 700 of FIG. 7. However, the user can select other hardware configurations for the different expander stages by simply checking in the appropriate box corresponding to the desired hardware configuration after accessing the display page 900.

The stage details portion 904 includes a number of physical details corresponding to the different expander stages. For example, referring to the stage one nozzle (S1N), details such as roughness, inlet metal angle, throat area, and trailing edge thickness can be included. In one aspect of this embodiment, the values for these details are pre-set when the user selects the particular stage hardware configuration in the columns 908. However, in a further aspect of this embodiment, the user can modify the pre-set values by typing the desired value in the respective field. This allows the user to evaluate the effects of such a detail change on the overall turbine performance. As will be apparent to those of ordinary skill in the relevant art, the display page 900 includes only one example of expander configuration details that can be made available to the user for review or modification. In other embodiments, more or fewer configuration details could be provided as the particular needs of the user may dictate.

It will be appreciated from the foregoing that although specific embodiments of the integrated analysis system have been described for purposes of illustration, various modifications may be made without deviating from the spirit or scope of the invention. Further, although the methods and systems have been described in the context of gas turbine power plant analyses, it will be understood by those of ordinary skill in the relevant art that the methods and systems disclosed here are equally well suited for other types of analyses. Those of ordinary skill in the relevant art will also appreciate that these and other changes can be made to the invention in light of the above detailed description.

While certain aspects of the invention are presented below in certain claim forms, the inventors nevertheless contemplate various embodiments of the invention consistent with other claim forms. Accordingly, the inventors reserve the right to add additional claims after filing the application to pursue such additional claim forms for all aspects of the invention as contemplated. Further, the terms used in the following claims should not be construed to limit the invention to the specific embodiments disclosed in the specification or claims, but instead should be construed to include all information exchange systems that operate in accordance with the claims to facilitate integrated analysis. The scope of the invention is therefore not limited by this disclosure, but instead, the scope of the invention is to be determined entirely by the following claims.

We claim:

1. A computer-based integrated analysis system for determining performance characteristics associated with a turbine, the turbine including at least a compressor, a combustor and an expander, the system comprising:

a performance module capable of determining at least a power output associated with the turbine, the performance module including a performance server component and a performance analysis component, wherein the performance server component facilitates data exchange between the performance module and at least one other module, and wherein the performance analysis component contains at least one equation useable in connection with turbine performance analysis;

an aerodynamic module capable of determining at least an operating pressure associated with the expander, the aerodynamic module including an aerodynamic server component and an aerodynamic analysis component, wherein the aerodynamic server component facilitates data exchange between the aerodynamic module and at least one other module, and wherein the aerodynamic analysis component contains at least one equation useable in connection with expander flow analysis; and a data management component that automatically directs an exchange of data between the performance module and the aerodynamic module.

2. The integrated analysis system of claim 1 further comprising a secondary flow module capable of determining at least a portion of a flow through the compressor that bypasses the combustor and passes to the expander, the secondary flow module including a secondary flow server component and a secondary flow analysis component, wherein the secondary flow server component facilitates data exchange between the secondary flow module and at least one other module, and wherein the secondary flow analysis component contains at least one equation useable in connection with secondary flow analysis, wherein the data management component automatically directs an exchange of data between the performance module, the aerodynamic module and the secondary flow module.

3. The integrated analysis system of claim 2 further comprising a heat transfer module capable of determining at least a temperature of a component of the expander, the heat transfer module including a heat transfer server component and a heat transfer analysis component, wherein the heat transfer server component facilitates data exchange between the heat transfer module and at least one other module, and wherein the heat transfer analysis component contains at least one equation useable in connection with heat transfer analysis, wherein the data management component automatically directs an exchange of data between the performance module, the aerodynamic module, the secondary flow module and the heat transfer module.

4. The integrated analysis system of claim 3 further comprising a component life module capable of determining at least a life span of a component of the expander, the component life module including a component life server component and a component life analysis component, wherein the component life server component facilitates data exchange between the component life module and at least one other module, and wherein the component life analysis component contains at least one equation useable in connection with a finite element stress analysis, wherein the data management component automatically directs an exchange of data between the performance module, the aerodynamic module, the secondary flow module, the heat transfer module and the component life module.

5. The integrated analysis system of claim 4 further comprising a bottoming cycle module capable of determining at least a power output of a bottoming cycle, the bottoming cycle module including a bottoming cycle server component and a bottoming cycle analysis component, wherein the bottoming cycle server component facilitates data exchange between the bottoming cycle module and at least one other module, and wherein the bottoming cycle analysis component contains at least one equation useable in connection with bottoming cycle performance analysis, wherein the data management component automatically directs an exchange of data between the performance module, the aerodynamic module, the secondary flow module, the heat transfer module, the component life module and the bottoming cycle module.

6. The integrated analysis system of claim 5 further comprising a heat balance module capable of determining at least a heat rate for a gas turbine, the heat balance module including a heat balance server component and a heat balance analysis component, wherein the heat balance server component facilitates data exchange between the heat balance module and at least one other module, and wherein the heat balance analysis component contains at least one equation useable in connection with gas turbine performance analysis, wherein the data management component automatically directs an exchange of data between the performance module, the aerodynamic module, the secondary flow module, the heat transfer module, the component life module, the bottoming cycle module and the heat balance module.

7. The integrated analysis system of claim 6 further comprising a cost module capable of determining at least a cost associated with operating the turbine, the cost module including a cost server component and a cost analysis component, wherein the cost server component facilitates data exchange between the cost module and at least one other module, and wherein the cost analysis component contains at least one equation useable in connection with gas turbine economic analysis, wherein the data management component automatically directs an exchange of data between the performance module, the aerodynamic module, the secondary flow module, the heat transfer module, the component life module, the bottoming cycle module, the heat balance module and the cost module.

8. A method in a computer system for providing information related to a gas turbine having an expander, the method comprising:

providing a performance module capable of determining at least a power output associated with the turbine, the performance module including a performance server component and a performance analysis component, wherein the performance server component facilitates data exchange between the performance module and at least one other module, and wherein the performance analysis component contains at least one equation useable in connection with turbine performance analysis;

providing an aerodynamic module capable of determining at least an operating pressure associated with the expander, the aerodynamic module including an aerodynamic server component and an aerodynamic analysis component, wherein the aerodynamic server component, wherein the aerodynamic server component facilitates data exchange between the aerodynamic module and at least one other module, and wherein the aerodynamic analysis component contains at least one equation useable in connection with expander flow analysis;

operating the performance module to determine a first value for a first property variable associated with the expander;

transferring the first value from the performance module to the aerodynamic module;

operating the aerodynamic module to determine a second value for a second property variable associated with the expander based on the first value received from the performance module;

transferring the second value from the aerodynamic module to the performance module; and operating the performance module to determine a third value for the first property variable based on the second value received from the aerodynamic module.

9. The method of claim 8 further comprising:

determining an error percentage between the third and first values of the first property variable; and when the error percentage is greater than a specified error percentage, transferring the third value from the performance module to the aerodynamic module;

operating the aerodynamic module to determine a fourth value for the second property variable based on the third value received from the performance module;

transferring the fourth value from the aerodynamic module to the performance module; and operating the performance module to determine a fifth value for the first property variable based on the fourth value received from the aerodynamic module.

10. The method of claim 8 wherein the expander includes at least a first stage, the first stage having a first nozzle assembly defining a forward plane and a first bucket assembly defining an aft plane, and wherein the first property variable is a pressure proximal to the forward plane of the nozzle assembly and the second property variable is a pressure proximal to the aft plane of the bucket assembly.

11. The method of claim 8 wherein the expander includes at least a first stage, the first stage having a first nozzle assembly defining a forward plane and a first bucket assembly defining an aft plane, and wherein the first property variable is a pressure proximal to the forward plane of the nozzle assembly and the second property variable is an efficiency associated with the first stage.

12. The method of claim 8 wherein the expander includes at least a first stage, the first stage having a first nozzle assembly defining a forward plane and a first bucket assembly defining an aft plane, and wherein the first property variable is a pressure proximal to the forward plane of the nozzle assembly and the second property variable is a power associated with the first stage.

13. The method of claim 8 wherein the gas turbine further includes a compressor and a combustor, the method further comprising:

providing a secondary flow module capable of determining at least a portion of a flow through the compressor that bypasses the combustor and passes to the expander, the secondary flow module including a secondary flow server component and a secondary flow analysis component, wherein the secondary flow server component facilitates data exchange between the secondary flow module and at least one other module, and wherein the secondary flow analysis component contains at least one equation useable in connection with secondary flow analysis;

transferring the second value from the aerodynamic module and the third value from the performance module to the secondary flow module;

operating the secondary flow module to determine a fourth value for a third property variable associated with the expander based on the second value received from the aerodynamic module and the third value received from the performance module;

transferring the fourth value from the secondary flow module to the performance module; and operating the performance module to determine a fifth value for the first property variable based on the fourth value received from the secondary flow module.

14. The method of claim 13 wherein the expander includes at least a first stage, the first stage having a first nozzle assembly defining a forward plane and a first bucket assembly defining an aft plane, and wherein the first property variable is a pressure proximal to the forward plane of the nozzle assembly, the second property variable is a pressure proximal to the aft plane of the bucket assembly and the third property variable is a flow distribution associated with the first stage.

15. The method of claim 13 further comprising:

determining the error percentage between the fifth and third values of the first property variable; and when the error percentage is greater than a specified error percentage, transferring the fifth value from the performance module to the aerodynamic module;

operating the aerodynamic module to determine a sixth value for the second property variable based on the fifth value received from the performance module;

transferring the sixth value from the aerodynamic module to the performance module; and operating the performance module to determine a seventh value for the first property variable based on the sixth value received from the aerodynamic module.

16. A method in a computer system for providing information related to performance of a power plant, the power plant having a turbine that includes an expander, the method comprising:

receiving a request for a user interface display page from a user computer;

in response to the received request, providing the requested user interface display page to the user computer, the requested user interface display page being configured to receive information related to an operating condition or configuration of the turbine;

receiving the information related to an operating condition or configuration of the turbine from the user computer;

in response to the received information, operating a first analysis module to generate a first value for a first property variable related to a flow through the expander;

transferring the first value from the first analysis module to a second analysis module;

operating the second analysis module to determine a second value for a second property variable related to the flow through the expander based on the first value received from the first analysis module;

transferring the second value from the second analysis module to the first analysis module; and operating the first analysis module to determine a third value for the first property variable based on the second value received from the second analysis module.

17. The method of claim 16 wherein the first property variable is a pressure and the second property variable is an expander stage power or an expander stage efficiency.

18. The method of claim 16 wherein the requested user interface display page is configured to receive a turbine type and further includes one or more display fields for presenting at least one of the first, second or third values.

19. The method of claim 16 wherein the first analysis module is a performance module and the second analysis module is an aerodynamic module.

20. The method of claim 16 further comprising:

determining an error percentage between the third and first values of the first property variable; and when the error percentage is greater than a specified error percentage, transferring the third value from the first analysis module to the second analysis module;

operating the second analysis module to determine a fourth value for the second property variable based on the third value received from the first analysis module;

transferring the fourth value from the second analysis module to the first analysis module; and operating the first analysis module to determine a fifth value for the first property variable based on the fourth value received from the second analysis module.

21. The method of claim 16 further comprising:

transferring the second value from the second analysis module and the third value from the first analysis module to a third analysis module;

operating the third analysis module to determine a fourth value for a third property variable related to the flow through the expander based on the second value received from the second analysis module and the third value received from the first analysis module; and transferring the fourth value from the third analysis module to the first analysis module; and operating the first analysis module to determine a fifth value for the first property variable based on the fourth value received from the third analysis module.

22. The method of claim 21 wherein:

the first analysis module is a performance module;

the second analysis module is an aerodynamic module;

the third analysis module is a secondary flow module;

the first property variable is an expander pressure;

the second property variable is an expander interstage temperature or pressure; and the third property value is an expander stage flow distribution.

23. A computer system for providing information related to a turbine having an expander, the computer system comprising:

first analysis means for determining at least a power output associated with the turbine;

second analysis means for determining at least an operating pressure associated with the expander;

means for operating the first analysis means to determine a first value for a first property variable associated with the expander;

means for transferring the first value from the first analysis means to the second analysis means;

means for operating the second analysis means to determine a second value for a second property variable associated with the expander based on the first value received from the first analysis means;

means for transferring the second value from the second analysis means to the first analysis means; and means for operating the first analysis means to determine a third value for the first property variable based on the second value received from the second analysis means.

24. The computer system of claim 23 further comprising:

means for determining an error percentage between the third and first values of the first property variable; and when the error percentage is greater than a specified error percentage, means for transferring the third value from the first analysis means to the second analysis means;

means for operating the second analysis means to determine a fourth value for the second property variable based on the third value received from the first analysis means;

means for transferring the fourth value from the second analysis means to the first analysis means; and means for operating the first analysis means to determine a fifth value for the first property variable based on the fourth value received from the second analysis means.

25. The computer system of claim 23 wherein the turbine further includes a compressor and a combustor, the system further comprising:

third analysis means for determining at least a portion of a flow through the compressor that bypasses the combustor and passes to the expander;

means for transferring the second value from the second analysis means and the third value from the first analysis means to the third analysis means;

means for operating the third analysis means to determine a fourth value for a third property variable associated with the expander based on the second value received from the second analysis means and the third value received from the first analysis means;

means for transferring the fourth value from the third analysis means to the first analysis means; and means for operating the first analysis means to determine a fifth value for the first property variable based on the fourth value received from the third analysis means.

26. The method of claim 25 wherein the turbine is a gas turbine and the expander includes at least a first stage, the first stage having a first nozzle assembly defining a forward plane and a first bucket assembly defining an aft plane, and wherein the first property variable is a pressure proximal to the forward plane of the nozzle assembly, the second property variable is a pressure proximal to the aft plane of the bucket assembly and the third property variable is a flow distribution associated with the first stage.

27. A computer-readable medium containing a display page for receiving information related to a configuration of a turbine and presenting information related to performance parameters of the turbine, the display page comprising:

a user input portion having one or more fields configured to receive information defining the turbine configuration for evaluation;

an output summary portion having one or more fields for presenting performance parameters for the turbine as defined by the information received in the input portion; and a convergence summary portion having a property variable field, a first value field, and a second value field, wherein the property variable field identifies a property variable associated with a flow through the turbine, the first value field presents a value corresponding to a first determination of the property variable, and the second value field presents a value corresponding to a second determination of the property variable.

28. The computer-readable medium of claim 27 wherein:
the first value field of the convergence summary portion presents a value determined by iteration between a first and second analysis module, and
the second value field of the convergence summary portion presents a value determined by iteration between the first and second analysis modules and a third analysis module.

29. The computer-readable medium of claim 27 wherein:
the first value field of the convergence summary portion presents a value determined by iteration between a performance analysis module and an aerodynamic analysis module, and
the second value field of the convergence summary portion presents a value determined by iteration between the performance analysis module, the aerodynamic analysis module, and a secondary flow analysis module.

30. The computer-readable medium of claim 27 wherein the display page further comprises tab bar, the tab bar including one or more user selectable tabs, wherein selection of one of the user-selectable tabs causes a spreadsheet to be displayed containing data related to the performance parameters of the turbine.

31. The computer-readable medium of claim 27 wherein the user input portion further includes an analysis option portion, the analysis option portion including one or more user-selectable analysis options, the one or more user selectable analysis options being related to the first and second values presented in the convergence summary portion.

32. The computer-readable medium of claim 31 wherein the one or more user-selectable analysis options include a first analysis option corresponding to determining the property variable by iteration between a first and second analysis module, and a second analysis option corresponding to determining the property variable by iteration between the first and second analysis modules and a third analysis module.

33. A computer-readable medium whose contents cause a computer system to provide information related to performance of a power plant, the power plant having a turbine that includes an expander, the information being provided by a method comprising:
receiving a request for a user interface display page from a user computer;
in response to the received request, providing the requested user interface display page to the user computer, the requested user interface display page being configured to receive information related to an operating condition or configuration of the turbine;
receiving the information related to an operating condition or configuration of the turbine from the user computer;
in response to the received information,
operating a first analysis module to generate a first value for a first property variable related to a flow through the expander;
transferring the first value from the first analysis module to a second analysis module;
operating the second analysis module to determine a second value for a second property variable related to the flow through the expander based on the first value received from the first analysis module;
transferring the second value from the second analysis module to the first analysis module; and
operating the first analysis module to determine a third value for the first property variable based on the second value received from the second analysis module.

34. The computer-readable medium of claim 33 wherein the first property variable is a pressure and the second property variable is an expander stage power or an expander stage efficiency.

35. The computer-readable medium of claim 33 wherein the requested user interface display page is configured to receive a turbine type and further includes one or more display fields for presenting at least one of the first, second or third values.

36. The computer-readable medium of claim 33 wherein the first analysis module is a performance module and the second analysis module is an aerodynamic module.

37. The computer-readable medium of claim 33 wherein the method further comprises:
determining an error percentage between the third and first values of the first property variable; and
when the error percentage is greater than a specified error percentage,
transferring the third value from the first analysis module to the second analysis module;
operating the second analysis module to determine a fourth value for the second property variable based on the third value received from the first analysis module;
transferring the fourth value from the second analysis module to the first analysis module; and
operating the first analysis module to determine a fifth value for the first property variable based on the fourth value received from the second analysis module.

* * * * *